(12) United States Patent
Nakamura et al.

(10) Patent No.: US 8,257,873 B2
(45) Date of Patent: Sep. 4, 2012

(54) FUEL CELL POWER GENERATION SYSTEM WITH VALVE ON RAW MATERIAL GAS SUPPLY PASSAGE AND VALVE DOWNSTREAM OF CARBON MONOXIDE DECREASING UNIT, AND METHOD FOR OPERATING FUEL CELL POWER GENERATION SYSTEM

(75) Inventors: Akinari Nakamura, Osaka (JP); Masataka Ozeki, Osaka (JP); Hideo Ohara, Osaka (JP); Yoshikazu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1165 days.

(21) Appl. No.: 11/883,308

(22) PCT Filed: Jan. 30, 2006

(86) PCT No.: PCT/JP2006/301488
§ 371 (c)(1),
(2), (4) Date: Jul. 30, 2007

(87) PCT Pub. No.: WO2006/080512
PCT Pub. Date: Aug. 3, 2006

(65) Prior Publication Data
US 2008/0311444 A1 Dec. 18, 2008

(30) Foreign Application Priority Data
Jan. 31, 2005 (JP) ................................. 2005-024163

(51) Int. Cl.
*H01M 8/04* (2006.01)
(52) U.S. Cl. ......................... 429/429; 429/408; 429/443

(58) Field of Classification Search .................. 429/429, 429/443, 408
See application file for complete search history.

(56) References Cited

U.S. PATENT DOCUMENTS
6,984,464 B2 * 1/2006 Margiott et al. .............. 429/429
(Continued)

FOREIGN PATENT DOCUMENTS
CN 1533622 A 9/2004
(Continued)

OTHER PUBLICATIONS
Chinese Office Action, w/ English translation thereof, issued in Chinese Patent Application No. CN 200680003 5485 dated Apr. 10, 2009.
(Continued)

*Primary Examiner* — Barbara Gilliam
*Assistant Examiner* — Zachary Best
(74) *Attorney, Agent, or Firm* — McDermott Will & Emery LLP

(57) ABSTRACT

The fuel cell power generation system includes a fuel cell, a reformer, a carbon monoxide decreasing unit, a first raw material supply source, a first valve which is provided to a first raw material flow passage, a second valve which is provided downstream of the carbon monoxide decreasing unit, a second raw material supply source which supplies a raw material to the inside of a flow passage which is closed by the first valve and the second valve from downstream of the carbon monoxide decreasing unit, and a control unit which controls the first valve and the second valve, wherein the control unit, after the first valve and the second valve are closed, supplies the raw material fed from the second raw material supply source to the inside of the flow passage closed by the first valve and the second valve at the time of stopping the system.

10 Claims, 19 Drawing Sheets

U.S. PATENT DOCUMENTS

| | | | |
|---|---|---|---|
| 2001/0002248 A1 | 5/2001 | Ukai et al. | |
| 2003/0104711 A1* | 6/2003 | Nakamura et al. | 439/19 |
| 2003/0203256 A1* | 10/2003 | Keskula et al. | 429/25 |
| 2004/0011703 A1 | 1/2004 | Abe | |
| 2004/0241510 A1 | 12/2004 | Miyauchi et al. | |

FOREIGN PATENT DOCUMENTS

| | | |
|---|---|---|
| JP | 2-18870 | 1/1990 |
| JP | 3-5301 | 1/1991 |
| JP | 6-68894 | 3/1994 |
| JP | 11-191426 | 7/1999 |
| JP | 2000-72402 | 3/2000 |
| JP | 2000-95504 | 4/2000 |
| JP | 2000-119004 | 4/2000 |
| JP | 2000095504 A * | 4/2000 |
| JP | 2000-290001 | 10/2000 |
| JP | 2002-356307 | 12/2002 |
| JP | 2003-243006 | 8/2003 |
| JP | 2003-272688 | 9/2003 |
| JP | 2004-178842 | 6/2004 |
| JP | 2004-307236 | 11/2004 |

OTHER PUBLICATIONS

International Preliminary Report on Patentability and Written Opinion of the International Searching Authority issued in International Application No. PCT/JP2006/301488, dated Aug. 9, 2007.

* cited by examiner

FUEL CELL POWER GENERATION SYSTEM WITH VALVE ON RAW MATERIAL GAS SUPPLY PASSAGE AND VALVE DOWNSTREAM OF CARBON MONOXIDE DECREASING UNIT, AND METHOD FOR OPERATING FUEL CELL POWER GENERATION SYSTEM

CROSS-REFERENCE TO RELATED APPLICATIONS

This application is a U.S. national phase application of PCT International Patent Application No. PCT/JP2006/301488 filed Jan. 30, 2006, claiming the benefit of priority of Japanese Patent Application No. 2005-024163 filed Jan. 31, 2005, all of which are incorporated by reference herein in their entirety.

TECHNICAL FIELD

The present invention relates to a fuel cell power generation system which generates power by using a fuel cell and an operating method of the fuel cell power generation system.

BACKGROUND ART

As a conventional fuel cell power generation system, there has been known a system which has the structure shown in FIG. 19 (for example, see pages 3-4, FIG. 1 and the like of Japanese Patent Laid-open Hei6 (1994)-68894 (referred as document 1)).

As shown in FIG. 19, the conventional fuel cell power generation system includes a raw material supply source 100 which supplies a raw material gas, a desulfurizing unit 101 which removes a sulfur component from the raw material gas, a reformer 102 which generates a hydrogen-rich gas from a mixed gas of a natural gas from which a sulfur component is removed and a water vapor by making use of a water vapor reforming reaction, and a carbon monoxide decreasing unit 103 which decreases carbon monoxide in the hydrogen-rich gas. Further, the fuel cell power generation system includes a fuel cell 105, wherein the hydrogen-rich gas with a decreased quantity of carbon monoxide which is sent to a fuel electrode and compressed air which is fed to an air electrode electrochemically react each other thus producing electricity, water and heat. A discharged fuel gas which is discharged from the fuel cell 105 is supplied to a combustion burner 106 which heats the reformer 102 and the discharged fuel gas is used to heat the reformer 102. The above-mentioned desulfurizing unit 101, the reformer 102 and the carbon monoxide reducing unit 103 mentioned above constitute a fuel treatment device 104.

Further, between the fuel treatment device 104 and the raw material supply source 100, a raw material gas supply passage 107 is provided and a raw material gas shut-off valve 108 is provided on the raw material gas supply passage 107. Further, between the fuel treatment device 104 and the fuel cell 105, a fuel-gas supply passage 109 is provided and a fuel-gas shut-off valve 110 is provided on the fuel-gas supply passage 109. Still further, between the fuel cell 105 and the combustion burner 106, a fuel-gas discharge passage 111 is provided and a fuel-cell outlet shut-off valve 112 is provided.

Further, a fuel cell bypass passage 113 which connects the fuel-gas supply passage 109 between the fuel-gas shut-off valve 110 and the fuel treatment device 104, and the fuel-gas discharge passage 111 between the fuel-cell outlet shut-off valve 112 and the combustion burner 106 is provided and a bypass passage shut-off valve 114 is provided on the fuel cell bypass passage 113.

In this manner, a plurality of shut-off valves are provided upstream and downstream of the fuel treatment device 104.

When the fuel cell power generation system is stopped, the raw material gas shut-off valve 108 is closed so as to stop the supply of the raw material gas, thereafter the respective shut-off valves 110, 112, 114 are closed.

However, in the conventional fuel cell power generation system, these solenoid valves are closed when the system operation is stopped, so that a closed passage is formed in flow passages including the fuel treatment device 104. On the other hand, although the inside of the fuel treatment device 104 assumes a temperature of 600° C. or more during the operation of the system, after operation of the system is stopped, the temperature is lowered over a lapse of time. Further, the water vapor which is contained in a fuel gas produced by the fuel treatment device 104 is condensed along with the lowering of the temperature whereby the lowering of pressure occurs in the closed passage.

From the above, in the fuel cell power generation system which performs starting and stopping, there has been a drawback that the closed passage of the flow passage assumes a negative pressure due to the lowering of the pressure after the operation of the fuel cell power generation system is stopped. This generation of negative pressure inside the closed passage becomes a factor which causes a system failure attributed to seizure of a solenoid valve or the deterioration of performance of a catalyst in the inside of the fuel treatment device 104 attributed to the inflow of air from the outside.

Accordingly, to overcome such drawbacks, the following fuel cell power generation systems have been proposed (for example, see the embodiment 1, paragraphs [0021], FIG. 2 and FIG. 3 of Japanese Patent Laid-open Heill (1999)-191426 (referred to as document 2), see paragraphs [0017] and FIG. 1 of Japanese Patent Laid-open 2000-95504 (referred to as document 3).

More specifically, the fuel cell power generation system described in the document 2 aims at the prevention of a negative pressure when the operation of the system is set in a stop mode. That is, the document 2 discloses the constitution in which a deoxygen device for supplying deoxidized air is provided upstream of a fuel reforming device, between a fuel reformer and a CO modifying unit or between a fuel reformer and a fuel cell.

Further, a reforming device described in document 3 discloses a constitution in which even when the operation of the reforming device is stopped and temperatures of respective reaction units are lowered and hence, gases in the inside of the respective reaction units are contracted, pressures in the inside of the respective reaction units are maintained at constant pressures by supplying a raw material gas into the reforming reaction units.

However, in the method described in document 2, the deoxidized air, that is, an incombustible gas which contains a large quantity of nitrogen is supplied to the inside of the fuel reforming device. Accordingly, at the next start of operation, at the time of performing the combustion treatment of a large quantity of residual fuel gas contained in the fuel reforming device, there arises a drawback that a combustion state becomes unstable. Further, the method requires a device such as a deoxidizing device or the like and hence, there arises a drawback that the constitution becomes complicated and increases the cost.

Further, as described in document 2, it may be possible to use a raw material gas or the like which is used in generation of power in place of an incombustible gas. However, the use of such a raw material gas may induce the precipitation of carbon in the reformer. Accordingly, as described in document 3, there arises a drawback that it is necessary to provide a wasteful step in terms of energy that a raw material and water are supplied until the temperature is lowered to a value equal to or below a carbon precipitation temperature. Further, to eliminate such wasteful use of energy, it may be possible to adopt a method in which the fuel reforming device is formed in a hermetically closed system and the fuel reforming device is subject to natural cooling. However, in this case, the fuel reforming device may not be able to withstand the generation of a level of negative pressure when the temperature is lowered to a temperature (approximately 300° C.) which lowers the possibility of carbon precipitation from a reformer temperature (approximately 600° C.) at which an usual operation is performed and hence, the device may break down.

DISCLOSURE OF THE INVENTION

The present invention has been made in view of the above-mentioned conventional drawbacks and it is an object of the present invention to provide a fuel cell power generation system and an operating method of the fuel cell power generation system which can prevent a hermetically closed space including a fuel treatment device from having a negative pressure by using a raw material gas even in a temperature region in which a reformer precipitates carbon at the time of performing the system operation stopping process.

To solve the above problems, a first aspect of the present invention is a fuel cell power generation system comprising:

a fuel cell which generates power using a fuel gas and an oxidizing agent gas;

a reformer which generates a hydrogen-rich fuel gas by causing a reaction of a raw material gas which contains an organic compound which is formed of at least carbon and hydrogen;

a carbon monoxide decreasing unit which decreases carbon monoxide in the fuel gas and supplies the fuel gas to the fuel cell;

a first raw material gas supply passage which supplies the raw material gas, a first valve which is provided on the first raw material gas supply passage;

a second valve which is provided downstream of the carbon monoxide decreasing unit;

a second raw material gas supply passage which supplies the raw material gas to a middle portion of the carbon monoxide decreasing unit or to the inside of a flow passage downstream of the carbon monoxide decreasing unit;

a raw material gas supply control unit which is provided on the second raw material gas supply passage; and a control unit, wherein the control unit, when process for stopping the system is performed or the system is stopped, allows the raw material gas supply control unit to perform a control such that the raw material gas is supplied to the inside of a flow passage which is closed by the first valve and the second valve.

A second aspect of the present invention is a fuel cell power generation system according to the first aspect of the present invention, wherein the fuel cell power generation system includes a pressure detecting unit which is provided in the flow passage which is closed by the first valve and the second valve, and the control unit performs a control such that the raw material gas is supplied by the raw material gas supply control unit when a pressure value which is detected by the pressure detecting unit becomes a value equal to or less than a first predetermined threshold value.

A third aspect of the present invention is a fuel cell power generation system according to the second aspect of the present invention, wherein the control unit, when the pressure value detected by the pressure detecting unit becomes equal to or more than a second predetermined threshold value which is larger than the first predetermined threshold value after the raw material gas is supplied by the raw material gas supply control unit, performs a control such that the raw material gas supply control unit stops the supply of the raw material gas.

A fourth aspect of the present invention is a fuel cell power generation system according to the first aspect of the present invention, wherein the raw material gas supply control unit is a third valve, and the supply of the raw material or the stopping of the supply of the raw material is performed by opening or closing the third valve.

A fifth aspect of the present invention is a fuel cell power generation system according to the first aspect of the present invention, wherein the fuel cell power generation system includes a pressure detecting unit which is provided on the flow passage which is closed by the first valve and the second valve, and the control unit closes the first valve and, closes the second valve when a pressure value detected by the pressure detecting unit becomes a value equal to or less than a third predetermined threshold value.

The sixth aspect of the present invention is a fuel cell power generation system according to the second aspect of the present invention, wherein the pressure detecting unit is provided between the first valve and the reformer.

A seventh aspect of the present invention is a fuel cell power generation system according to the first aspect of the present invention, wherein the fuel cell power generation system includes a temperature detecting unit which is provided on the flow passage which is closed by the first valve and the second valve, and the control unit performs a control such that raw material gas is supplied by the raw material gas supply control unit when a value which is detected by the temperature detecting unit becomes a value equal to or less than a fourth predetermined threshold value.

An eighth aspect of the present invention is a fuel cell power generation system according to the first aspect of the present invention, wherein the carbon monoxide decreasing unit has:

a shift reaction unit which generates carbon dioxide and hydrogen from carbon monoxide and water vapor in the fuel gas; and a selective oxidation reaction unit which decreases the carbon monoxide in the fuel gas which is fed from the shift reaction unit by a selective reaction.

A ninth aspect of the present invention is a fuel cell power generation system according to the eighth aspect of the present invention, wherein the middle portion of the carbon monoxide decreasing unit is a portion between the shift reaction unit and the selective oxidation reaction unit.

A tenth aspect of the present invention is a fuel cell power generation system according to the first aspect of the present invention, wherein the fuel cell power generation system further includes a fuel gas discharge passage through which the fuel gas discharged from the fuel cell flows, and the second valve is provided on the fuel gas discharge passage.

An eleventh aspect of the present invention is a fuel cell power generation system according to the tenth aspect of the present invention, wherein the fuel cell power generation system further includes:

a heating unit which heats the reformer which is connected with the fuel gas discharge passage;

a fuel gas supply passage for supplying the fuel gas and being provided between the carbon monoxide decreasing unit and the fuel cell; and a fuel cell bypass passage which connects the fuel gas supply passage and the fuel gas discharge passage and bypasses the fuel cell, and the second valve includes:

a fuel flow passage switching valve which is provided to a portion where the fuel gas supply passage and the fuel cell bypass passage are merged with each other and switches over the fuel gas to the fuel cell side or the fuel cell bypass passage side;

a fuel cell outlet valve which is provided on the fuel gas discharge passage between the portion where the fuel cell bypass passage and the fuel gas discharge passage are merged with each other and the fuel cell; and a fuel gas discharge passage valve which is provided on the fuel gas discharge passage between the portion where the fuel cell bypass flow passage and the fuel gas discharge passage are merged with each other and the heating unit, wherein the closure of the second valve implies the closure of the fuel cell outlet valve and the fuel gas discharge passage valve by switching the fuel flow passage switching valve to the fuel cell bypass passage side.

A twelfth aspect of the present in the present invention is a fuel cell power generation system according to the eleventh aspect of the present invention, wherein the fuel cell power generation system further includes:

a pressure detecting unit which is provided on a flow passage which is closed by the first valve, the fuel flow passage switching valve, the fuel cell outlet valve and the fuel gas discharge passage valve, and the control unit closes the first valve and the fuel cell outlet valve and, at the same time, switches the fuel flow passage switching valve to the fuel cell bypass passage side and, thereafter, closes the fuel gas discharge passage valve when a pressure value detected by the pressure detecting unit assumes a value equal to or less than a predetermined threshold value.

A thirteenth aspect of the present invention is a fuel cell power generation system according to the eleventh aspect of the present invention, wherein the fuel cell power generation system further includes a combustion detecting unit for detecting the combustion of the heating unit, and the control unit closes the first valve and the fuel cell outlet valve and, at the same time, switches the fuel flow passage switching valve to the fuel cell bypass passage side and, thereafter, closes the fuel gas discharge passage valve when the combustion detecting unit detects the stopping of the combustion of the heating unit.

A fourteenth aspect of the present invention is an operating method of a fuel cell power generation system which comprises:

a fuel cell which generates power using a fuel gas and an oxidizing agent gas;

a reformer which generates a hydrogen-rich fuel gas by causing a reaction between a raw material gas which contains an organic compound which is formed of at least carbon and hydrogen and water vapor;

a carbon monoxide decreasing unit which decreases carbon monoxide in the fuel gas and supplies the fuel gas to the fuel cell;

a first raw material gas supply passage which supplies the raw material gas to the reformer, a first valve which is provided on the raw material gas supply passage;

a fuel gas discharge passage through which a discharge gas which is discharged from the fuel cell flows; and a second valve which is provided on the fuel gas discharge passage, wherein the operating method includes a step in which the raw material gas is supplied to the inside of a flow passage which is closed by the first valve and the second valve when process for stopping the system is performed or the system is stopped.

A fifteenth aspect of the present invention is a fuel cell power generation system according to the fifth aspect of the present invention, wherein the pressure detecting unit is provided between the first valve and the reformer.

According to the present invention, it is possible to provide a fuel cell power generation system and an operating method of the fuel cell power generation system which can prevent the hermetically closed space including the fuel treatment device from having a negative pressure by using the raw material gas even in the temperature region in which the reformer precipitates carbon at the time of performing the system operation stopping process.

Figure 1:
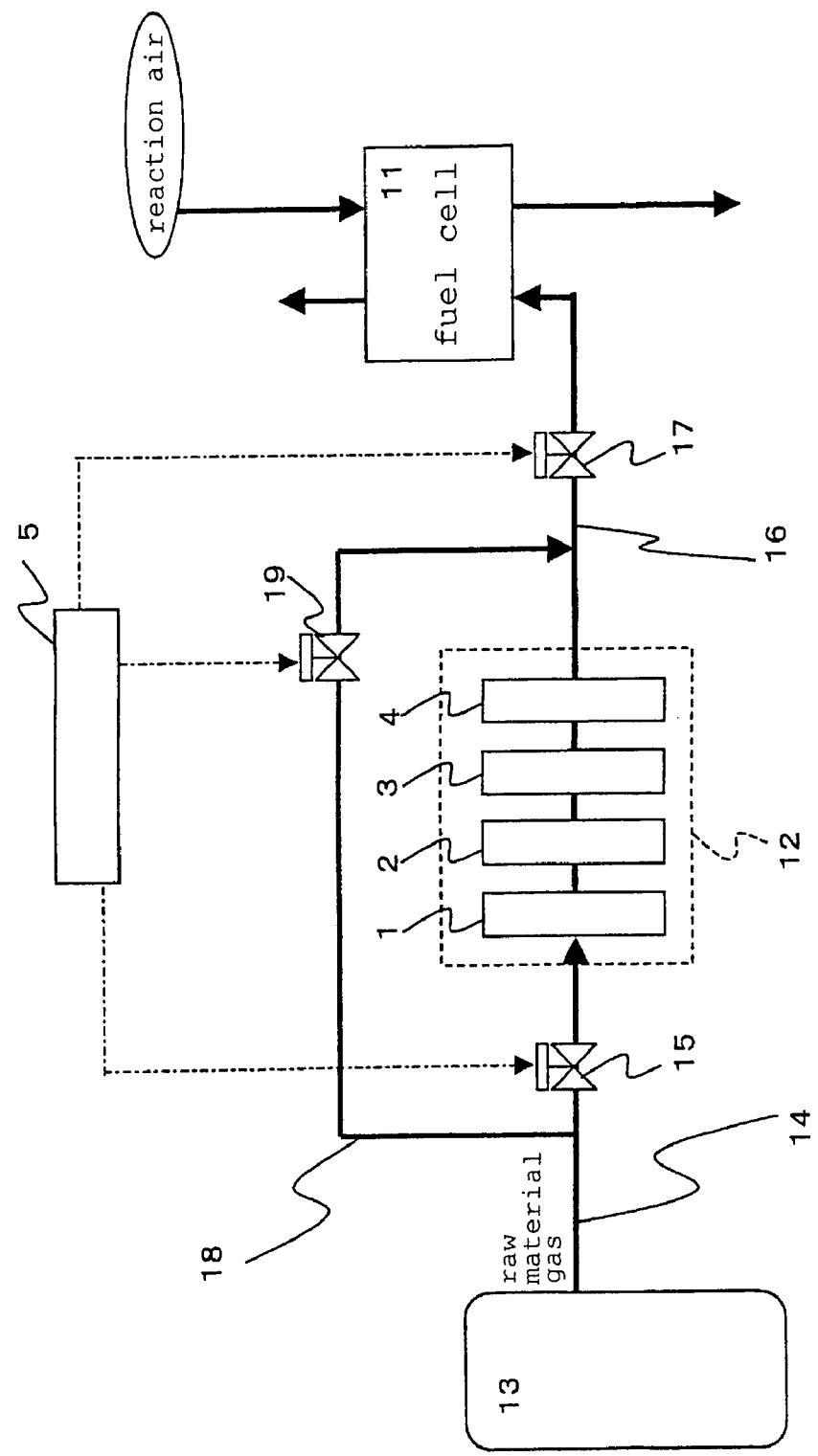
FIG. 1 is a constitutional view showing a fuel cell power generation system of an embodiment 1 according to the present invention.

DESCRIPTION OF REFERENCE NUMERALS AND SIGNS 1, 45: desulfurizing unit
2, 46: reformer
3, 47: shift reaction unit
4, 48: selective oxidation reaction unit
5, 21, 22, 24, 26, 30, 50, 51, 53, 54: control unit
11, 31: fuel cell
12, 32: fuel treatment device
13, 34: raw material supply source
14, 35: raw material gas supply passage
15, 36: raw material gas shut-off valve
16, 37: fuel gas supply passage
17: fuel gas shut-off valve
18, 43: fuel-treatment-device bypass passage
19, 44: bypass passage valve
20, 49: pressure gauge
23, 52: temperature detector
33: burner
27, 38: fuel gas discharge passage
39: fuel cell bypass passage
40: fuel flow passage switching valve
25, 41: fuel cell outlet valve
42: fuel gas discharge passage valve,
55: flame detector

BEST MODE FOR CARRYING OUT THE INVENTION

Hereinafter, embodiments of the present invention are explained in conjunction with drawings.

Embodiment 1

FIG. 1 is a constitutional view showing a fuel cell power generation system according to an embodiment 1 of the present invention. As shown in FIG. 1, the fuel cell power generation system according to this embodiment 1 includes a fuel cell 11 which generates power using a fuel gas and an oxidizing agent gas, a fuel treatment device 12 which generates a hydrogen-rich fuel gas by performing the water-vapor reforming of a raw material gas, and a raw material supply source 13 which supplies the raw material gas into the fuel treatment device 12. Further, the fuel cell power generation system includes a raw material gas supply passage 14 which supplies the raw material gas to the fuel treatment device 12 from the raw material supply source 13, and a fuel gas supply passage 16 which supplies the fuel gas to the fuel cell 11 from the fuel treatment device 12. Still further, a raw material gas shut-off valve 15 which performs the supply/shut-off of the raw material gas to the fuel treatment device 12 is provided on the raw material gas supply passage 14, while a fuel gas shut-off valve 17 which performs the supply/shut-off of the fuel gas to the fuel cell 11 and prevents a gas backflow from the fuel cell 11 at the time of stopping the fuel cell power generation system is provided on a fuel gas supply passage 16.

Further, the fuel cell power generation system includes a fuel-treatment-device bypass passage 18 which, using the flow directions of the raw material gas and the fuel gas as the reference, branches the raw material gas which is supplied from the raw material supply source 13 from the raw material gas supply passage 14 which is arranged upstream of the raw material gas shut-off valve 15 and merges the raw material gas into the fuel gas supply passage 16 which is arranged upstream of the fuel gas shut-off valve 17. On the fuel-treatment-device bypass passage 18, a bypass passage valve 19 which performs the supply/shut-off of the raw material gas to the fuel-treatment-device bypass passage 18 is provided. Further, the fuel cell power generation system includes a control unit 5 which controls the raw material gas shut-off valve 15, the fuel gas shut-off valve 17, and the bypass passage valve 19.

The above-mentioned fuel treatment device 12 includes a desulfurizing unit 1 which removes a sulfur component from the raw material gas supplied from the raw material supply source 13, and a reformer 2 which produces a hydrogen-rich fuel gas by performing the water vapor reforming of the raw material gas from which the sulfur component is removed. Further, the fuel treatment device 12 includes a shift reaction unit 3 which performs a shift reaction for producing hydrogen and carbon dioxide from carbon monoxide and water vapor which are contained in the fuel gas, and a selective oxidation reaction unit 4 which performs a selective oxidation reaction for producing carbon dioxide by allowing carbon monoxide which is not removed by the shift reaction unit 3 to react with oxygen. With the provision of the shift reaction unit 3 and selective oxidation reaction unit 4, it is possible to reduce carbon monoxide contained in the fuel gas.

Here, one example of a first raw material gas supply passage of the present invention corresponds to the raw material gas supply passage 14, and one example of a first valve of the present invention corresponds to a raw material gas shut-off valve 15 of the embodiment 1. Further, one example of a second valve of the present invention corresponds to the fuel gas shut-off valve 17 of the embodiment 1, and one example of a second raw material gas supply passage of the present invention corresponds to the fuel-treatment-device bypass passage 18 of the embodiment 1. Further, one example of a raw material gas supply control unit of the present invention and a third valve of the present invention correspond to the bypass passage valve 19 of the embodiment 1, and one example of a control unit of the present invention corresponds to the control unit 5 of the embodiment 1.

Further, although the desulfurizing unit 1 is arranged in the inside of the fuel treatment device 12 in this embodiment 1, the desulfurizing unit 1 may be arranged between the raw material supply source 13 and the raw material gas shut-off valve 15.

Further, in the embodiment 1, one example of the flow passage which is closed by the first valve and the second valve of the present invention corresponds to the fuel treatment device 12 and portions of the raw material gas supply passage 14 and the fuel gas supply passage 16 which are shut off by the raw material gas shut-off valve 15 and the fuel gas shut-off valve 17. Hereinafter, the flow passage is also referred to as a hermetically closed space including the fuel treatment device 12.

Further, as the raw material gas, methane, a natural gas, a city gas or the like may be used. Further, as the raw material supply source 13, a gas cylinder in which a carbon-hydroxide-based gas such as methane, a natural gas or the like is filled or piping for a city gas or the like may be used.

Hereinafter, the manner of operation of the fuel cell power generation system of this embodiment 1 having the above-mentioned constitution is explained.

First of all, the manner of operation of the fuel cell power generation system of the embodiment 1 at the time of generating power is explained.

By opening the raw material gas shut-off valve 15 and the fuel gas shut-off valve 17 and by closing the bypass passage valve 19, the raw material gas in the raw material supply source 13 is supplied to the fuel treatment device 12 through the raw material gas supply passage 14. When the raw material gas is supplied to the fuel treatment device 12, a sulfur component in the raw material gas is removed in the desulfurizing unit 1, and is subjected to a reform reaction with water vapor under a high temperature of 600° C. or more in the reformer 2 thus forming a hydrogen-rich fuel gas. Then, in the shift reaction unit 3 and the selective oxidation reaction unit 4 of the fuel treatment device 12, carbon monoxide which is contained in the fuel gas is removed to assume the concentration which does not damage a catalyst of the fuel cell 11.

The hydrogen-rich fuel gas whose concentration of carbon monoxide is sufficiently decreased by the fuel treatment device 12 is supplied to the fuel cell 11 through the fuel gas supply passage 16 and serves to generate power together with supplied air. Here, a mixture gas of hydrogen, water vapor, carbon dioxide and carbon monoxide which is not used for the generation of power is discharged from a discharge side of the fuel cell 11.

Next, the manner of operation after the completion of the generation of power by the fuel cell power generation system in the embodiment 1 is explained. Here, along with the explanation of the manner of operation after the completion of the generation of power by the fuel cell power generation system of the embodiment 1, one embodiment of the operation method of the fuel cell power generation system of the present invention is also explained. Further, the following explanation is also applicable to other embodiments described hereinafter.

The supply of air to the fuel cell 11 is stopped and, at the same time, the raw material gas shut-off valve 15 is closed so that the supply of the raw material gas to the fuel treatment device 12 is stopped. Further, the fuel gas shut-off valve 17 is closed so that the supply of the fuel gas to the fuel cell 11 is stopped.

Next, the bypass passage valve 19 is opened so that the raw material gas is supplied to the fuel gas supply passage 16 which is provided upstream of the fuel gas shut-off valve 17 through the fuel-treatment-device bypass passage 18. When the supply of the raw material gas is finished, the bypass passage valve 19 is closed and the fuel-treatment-device bypass passage 18 is sealed. Here, although the bypass passage valve 19 is used for stopping the supply of the raw material gas through the above-mentioned fuel-treatment-device bypass passage 18, when the supply of the raw material gas from the second raw material supply source which is different from the first raw material supply source is stopped, with the use of the second raw material supply source which is capable of controlling the stopping of the supply of the raw material, it is possible to realize the operating method of the fuel cell power generation system of this embodiment without using the bypass passage valve 19.

According to the constitution and the operating method of the fuel cell power generation system according this embodiment 1, it is possible to obtain the following operation and advantageous effects.

When the fuel cell power generation system is stopped, the fuel treatment device 12, the raw material gas supply passage 14 and a portion of the fuel gas supply passage 16 are shut off by the raw material gas shut-off valve 15 and the fuel gas shut-off valve 17 and hence, a hermetically closed state is established. Accordingly, along with a lapse of time, the inner temperature of the fuel treatment device 12 or the like is lowered thus giving rise to the lowering of pressure. Further, a water vapor in the fuel gas sealed in the inside of the fuel treatment device 12 or the like is condensed thus giving rise to further lowering of pressure.

However, according to this embodiment 1, since the raw material gas is supplied to the fuel gas supply passage 16 which is arranged upstream of the fuel gas shut-off valve 17 through the fuel-treatment-device bypass passage 18, it is possible to restore the pressure in the hermetically closed space including the fuel treatment device 12.

Further, the reforming catalyst of the reformer 2 precipitates carbon thereon when the reforming catalyst is exposed to the hydrocarbon atmosphere such as methane which exhibits the poor water vapor at a temperature of 400° C. or more, and the performance of the catalyst is deteriorated. However, according to this embodiment 1, the raw material gas is supplied from the downstream of the fuel treatment device 12 and hence, the raw material gas is supplied to the shift reaction unit 3 and the selective oxidation reaction unit 4 which are arranged downstream of the reformer 2 corresponding to the lowering of pressure. Accordingly, even when the raw material gas flows in the reformer 2 which is positioned upstream of the shift reaction unit 3 and the selective oxidation reaction unit 4, a flow rate of the raw material gas is extremely small, that is, at a level of the inflow by diffusion and, at the same time, a small quantity of water vapor remains in the inside of the reformer 2 and hence, the performance of the catalyst is not influenced whereby the catalyst can ensure the performance thereof.

Further, a downstream end (a raw material gas flow-out side) of the fuel-treatment-device bypass passage 18 may be connected at a portion between the shift reaction unit 3 and the selective oxidation reaction unit 4 which constitutes one example of a middle portion of the carbon monoxide reducing unit of the present invention.

Further, although one example of the carbon monoxide reducing unit of the present invention corresponds to the shift reaction unit 3 and the selective oxidation reaction unit 4 of this embodiment 1, the carbon monoxide reducing unit may be formed of only the shift reaction unit. In this case, it is preferable that the downstream end (raw material gas flow-out side) of the fuel-treatment-device bypass passage 18 may be connected to the downstream side of the shift reaction unit 3. In short, even when the raw material gas which is supplied through the fuel-treatment-device bypass passage 18 flows in the inside of the reformer 2, a predetermined capacity should be provided downstream of the reformer 2 such that only a quantity of the raw material gas which does not influence the performance of the catalyst flows in the inside of the reformer 2.

In this manner, even when the raw material gas which is supplied through the fuel-treatment-device bypass passage 18 flows in the inside of the reformer 2, for example, by constituting the downstream side of the reformer 2 such that the raw material gas is supplied from a portion which has a sufficient capacity to allow only a small quantity of the raw material gas which does not influence the performance of the catalyst to flow into the reformer 2, a possibility that carbon is precipitated in the inside of the reformer 2 becomes low whereby it is possible to suppress the lowering of the performance of the catalyst.

Accordingly, by supplying the raw material gas from the middle portion of the carbon monoxide reducing unit on the downstream side of the reformer or from the flow passage on the downstream side of the carbon monoxide reducing unit as in the case of this embodiment, it is possible to obtain an advantageous effect that even in the temperature region in which the reformer precipitates carbon when the fuel cell power generation system is stopped, it is possible to prevent the hermetically closed space including the fuel treatment device from having the negative pressure using the raw material gas.

Here, it is possible to obtain the above-mentioned advantageous effect with the constitutions of the embodiments described hereinafter in the same manner.

Further, although the case in which "the supply of the raw material gas to the fuel gas supply passage 16 by opening the bypass passage valve 19" is performed once is explained with respect to this embodiment 1, this operation is performed "for restoring the pressure in the hermetically closed space including the fuel treatment device 12" and hence, such an operation may be performed plural times.

Embodiment 2

Figure 2:
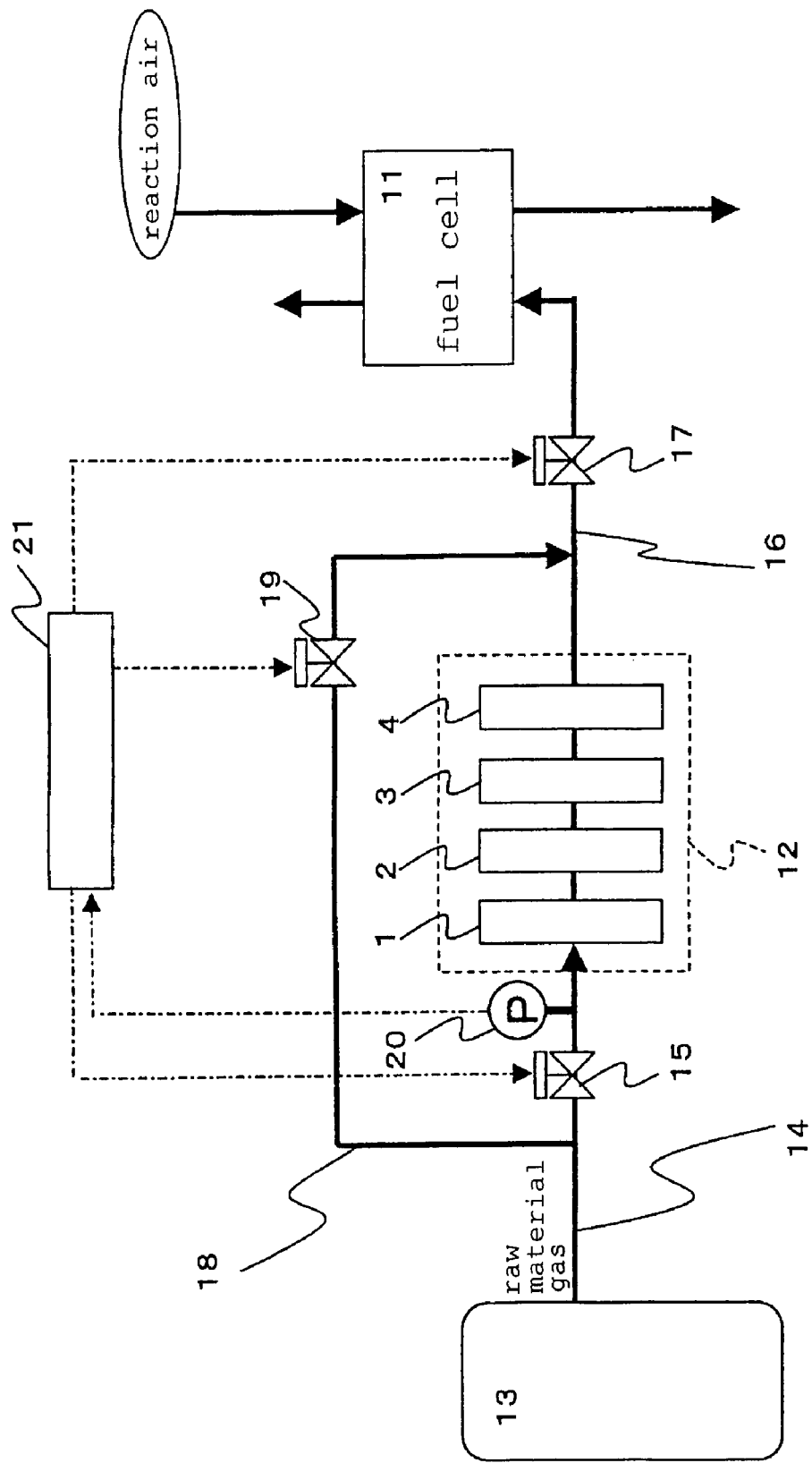
FIG. 2 is a constitutional view showing a fuel cell power generation system of an embodiment 2 according to the present invention.

FIG. 2 is a constitutional view showing the fuel cell power generation system according to an embodiment 2 of the present invention. Units having the identical members and functions with corresponding units shown in FIG. 1 are given the same numerals and their explanation is omitted. The fuel cell power generation system of this embodiment 2 has the same basic constitution as the fuel cell power generation system of the embodiment 1 shown in FIG. 1. However, embodiment 2 differs from the embodiment 1 with respect to a point that the fuel cell power generation system includes a pressure gauge 20 which detects pressure of the raw material gas supply passage 14 between the raw material gas shut-off valve 15 and the fuel treatment device 12, and a control unit 21 which controls an open/close operation of the bypass passage valve 19 upon receiving a signal from the pressure gauge 20 in place of the control unit 5 of the embodiment 1. Here, the pressure gauge 20 and the control unit 21 of this embodiment 2 correspond to one example of the pressure detecting unit and the control unit of the present invention.

Figure 3:
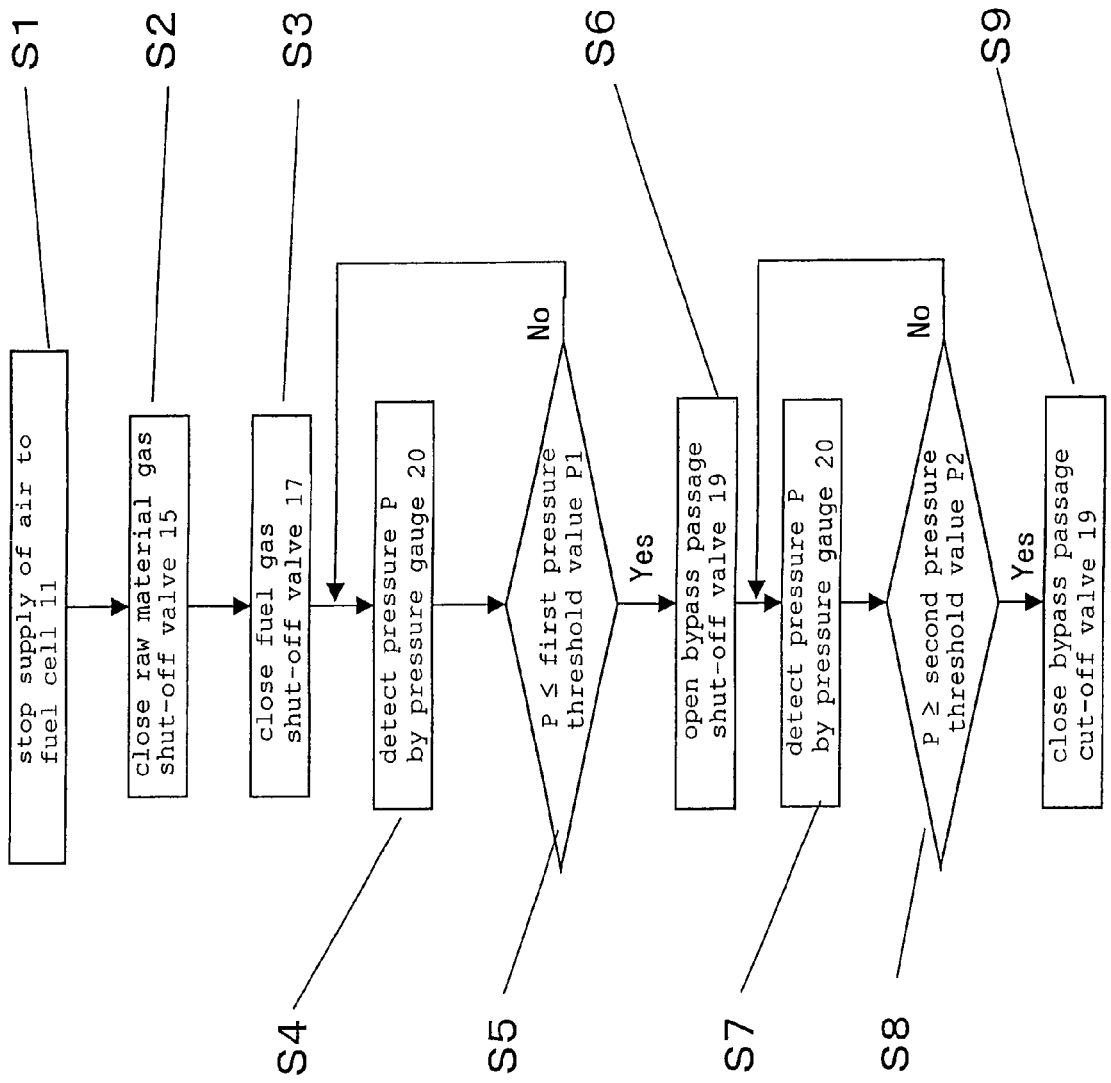
FIG. 3 is a flow chart showing an operation of the fuel cell power generation system of the embodiment 2 according to the present invention.

Since the manner of operation of the fuel cell power generation system of this embodiment 2 at the time of generating power is substantially equal to the corresponding manner of operation of the embodiment 1, the explanation of the manner of operation of the fuel cell power generation system is omitted, and only the manner of operation of the fuel cell power generation system of this embodiment 2 after the completion of the power generating operation is explained in conjunction with FIG. 3. FIG. 3 is an exemplary flow chart showing the manner of operation at the time of finishing the power generating operation of the fuel cell power generation system of the embodiment 2.

The supply of air which is supplied to the fuel cell 11 is stopped (S1) and, at the same time, the raw material gas shut-off valve 15 is closed (S2) so that the supply of the raw material gas into the fuel treatment device 12 is stopped. Further, the fuel gas shut-off valve 17 is closed (S3) so that the supply of the fuel gas into the fuel cell 11 is stopped.

Next, pressure P of the hermetically closed space including the fuel treatment device 12 on an upstream side of the fuel treatment device 12 is detected by the pressure gauge 20 (S4). The detected pressure P is compared with a first pressure threshold value P1 which is one example of a first predetermined threshold value of the present invention by the control unit 21 (S5). Here, the first pressure threshold value P1 is a predetermined value for restoring the pressure of the hermetically closed space when the internal pressure of the hermetically closed space becomes equal to or less than P1. Accordingly, an upper limit value of the first pressure threshold value P1 is set to a value lower than the pressure of the raw material gas supplied to the system. Further, a lower limit value of the first pressure threshold value P1 is set to a value higher than a low-pressure-side pressure which the fuel cell power generation system can withstand in view of the performance and structure thereof. For example, when a city gas is used as the raw material gas, since the supply pressure of the gas is 1.0 to 2.5 kPa (gauge pressure), the first pressure threshold value P1 is set to a value lower than 2.5 kPa.

Further, when the hermetically closed space which uses a solenoid valve as the raw material gas shut-off valve 15 or the fuel gas shut-off valve 17 assumes a negative pressure, the seizure of a valve element of the solenoid valve frequently occurs and hence, there may arise a case that the solenoid valve cannot be started next time. To prevent such a phenomenon, it is preferable to set the first pressure threshold value P1 to a value equal to or more than 0 kPa (gauge pressure). Further, when a city gas is supplied to the closed space which assumes the negative pressure, a gas instantly flows in the closed space and a utility (a pipe outside the system, a gas cock and the like) side instantaneously assumes a negative pressure and hence, a safety device (a shut-off device in the inside of a gas microcomputer meter, a fuse of the gas cock or the like) is operated so that the supply of the gas is stopped. As a result, even when the pressure restoring operation is performed, the further pressure restoration cannot be obtained and, at the same time, a gas pipe which is provided downstream of the safety device assumes further negative pressure thus giving rise to a case that the system cannot be started next time. To prevent such a phenomenon, it is preferable to set the first pressure threshold value P1 to a value equal to or more than 0 kPa.

Further, when the system breaks down, there may arise a case that air backflows in the raw material gas supply passage. Also from this point of view, it is desirable to prevent the hermetically closed space from having the negative pressure as much as possible at the time of supplying a city gas to the hermetically closed space.

When the relationship $P \leq P1$ is established, the bypass passage valve 19 is opened (S6) and the raw material gas is supplied to the fuel gas supply passage 16 which is provided upstream of the fuel gas shut-off valve 17 through the fuel-treatment-device bypass passage 18. Due to the supply of the raw material gas to the fuel gas supply passage 16, the pressure of the hermetically closed space including the fuel treatment device 12 can be restored.

Subsequently, when pressure P is detected, the detected pressure P and a second pressure threshold value P2 which is one example of the second predetermined threshold value of the present invention are compared with each other by the control unit 21 (S7), and when the relationship $P \geq P2$ is established, the bypass passage valve 19 is closed (S8), and the fuel-treatment-device bypass passage 18 is sealed. Here, the second pressure threshold value P2 is a predetermined value for finishing the restoration of the pressure when the internal pressure of the hermetically closed space becomes equal to or more than the second pressure threshold value P2. Accordingly, the second pressure threshold value P2 is determined within a range of the supply pressure of the raw material gas which is supplied to the system. For example, when the city gas is used as the raw material gas, although the supply pressure is 1.0 to 2.5 kPa (gauge pressure), the second pressure threshold value P2 is set to a value which is lower than the supply pressure of the city gas.

By adopting the constitution and the operating method of the fuel cell power generation system of the above-mentioned embodiment 2, it is possible to obtain the following manner of operation and advantageous effects.

When the fuel cell power generation system is stopped, the fuel treatment device 12, the raw material gas supply passage 14 and a portion of the fuel gas supply passage 16 are shut off by the raw material gas shut-off valve 15 and the fuel gas shut-off valve 17 and hence, a hermetically closed space is established. Accordingly, along with a lapse of time, an inner temperature of the fuel treatment device 12 or the like is lowered thus giving rise to the lowering of pressure. Further, a water vapor in the fuel gas sealed in the inside of the fuel treatment device 12 or the like is condensed thus giving rise to further lowering of pressure.

However, in this embodiment 2, the pressure of the above-mentioned hermetically closed space is detected by the pressure gauge 20 and, when the pressure becomes equal to or less than the first pressure threshold value P1, the raw material gas is supplied to the fuel gas supply passage 16 which is provided upstream of the fuel gas shut-off valve 17 through the fuel-treatment-device bypass passage 18. When the pressure which is detected by the pressure gauge 20 becomes equal to or more than the second pressure threshold value P2 along with such supply of the raw material gas, the bypass passage valve 19 is closed and hence, the flow passage is sealed whereby the restoration of the pressure of the hermetically closed space including the fuel treatment device 12 can be realized.

Further, the reforming catalyst in the reformer 2 precipitates carbon thereon when the reforming catalyst is subjected to the hydrocarbon atmosphere such as methane which exhibits poor water vapor at a temperature of 400° C. or more, and the performance of the catalyst is deteriorated. However, according to this embodiment, the raw material gas is supplied from the downstream of the fuel treatment device 12 and hence, the raw material gas is supplied to the shift reaction unit 3 and the selective oxidation reaction unit 4 which are arranged downstream of the reformer 2 corresponding to the lowering of pressure. Accordingly, even when the raw material gas flows in the reformer 2 which is positioned upstream of the shift reaction unit 3 and the selective oxidation reaction unit 4, a flow rate of the raw material gas is extremely small, that is, at a level of the inflow by diffusion and, at the same time, a small quantity of water vapor remains in the inside of the reformer 2 and hence, the performance of the catalyst is not influenced whereby the catalyst can ensure the performance thereof.

Further, although the case in which "the supply of the raw material gas to the fuel gas supply passage 16 by opening the bypass passage valve 19" is performed once is explained in this embodiment 2, this operation is performed "for restoring the pressure in the hermetically closed space including the fuel treatment device 12" and hence, such an operation may be performed plural times in response to the pressure signal from the pressure gauge 20 in the control unit 21.

Further, it is preferable to set the above-mentioned first pressure threshold value P1 and the second pressure threshold value P2 such that the relationship $P2 \geq P1$ is established. This is because that such relationship ensures the sufficient supply of the raw material gas. Further, it is preferable to set the above-mentioned first pressure threshold value P1 such that the relationship $P1 > 0$ is established. This is because that such relationship can surely prevent the generation of the negative pressure in the hermetically closed space.

Further, when a city gas for general household use is used as the raw material gas, since the gas pressure is 1.0 kPa to 2.5 kPa at a gauge pressure, it is preferable to set the second pressure threshold value P2 to satisfy the relationship $1.0 \geq P2$.

This is because that assuming a case in which P2 is set to 1.5 kPa (gauge pressure), for example, in the system which is installed in a low-pressure region where the supply pressure is 1.2 kPa (gauge pressure), the pressure can be restored only up to 1.2 kPa (gauge pressure) and hence, the pressure restoring operation is not finished whereby a state that the utility side and the closed space are communicated with each other is continued. Accordingly, by setting the second pressure threshold value P2 equal to or less than 1.0 kPa (gauge pressure), it is possible to surely finish the pressure restoring operation in the whole regions ranging from the low pressure region to the high pressure region and hence, the utility side and the closed space can be partitioned by the raw material gas shut-off valve 15 thus realizing the reliable sealing of the flow passage.

Further, in the embodiment 2, "the pressure gauge 20 is provided on the raw material gas supply passage 14 which is provided between the raw material gas shut-off valve 15 and the fuel treatment device 12". However, it is sufficient that the pressure gauge 20 can detect the pressure of at least the space which includes the fuel treatment device 12 which is hermetically closed by the raw material gas shut-off valve 15 and the fuel gas shut-off valve 17 and hence, the pressure gauge 20 may be provided on the fuel gas supply passage 16 which is provided between the fuel treatment device 12 and the fuel gas shut-off valve 17, may be provided on the fuel-treatment-device bypass passage 18 which is provided downstream of the bypass passage valve 19 or may be provided in the inside of the fuel treatment device 12.

Embodiment 3

Figure 4:
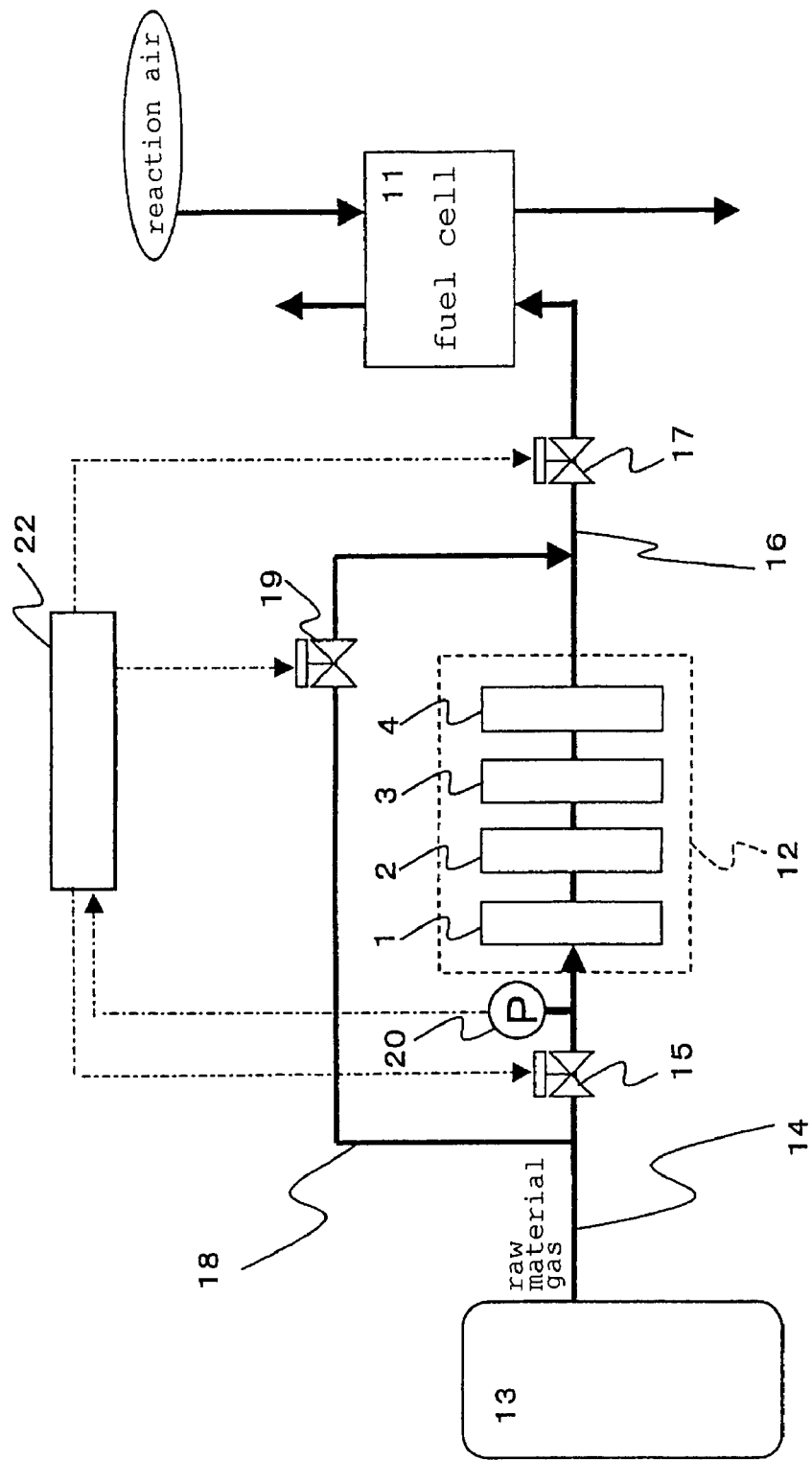
FIG. 4 is a constitutional view showing a fuel cell power generation system of an embodiment 3 according to the present invention.

FIG. 4 is a constitutional view showing a fuel cell power generation system according to an embodiment 3 of the present invention. Units having the identical members and functions with corresponding units shown in FIG. 2 are given the same numerals and their explanation is omitted. The fuel cell power generation system of this embodiment 3 has the same basic constitution as the fuel cell power generation system of the embodiment 2 shown in FIG. 2. However, this embodiment 3 differs from the embodiment 2 with respect to a point that the fuel cell power generation system includes a control unit 22 which further possesses a function of controlling an open/close operation of the fuel gas shut-off valve 17 upon receiving a signal from the pressure gauge 20 in place of the control unit 21 of the embodiment 2. Accordingly, the explanation is made hereinafter by focusing on points which make this embodiment 3 different from the embodiment 2. Here, one example of a control unit of the present invention corresponds to the control unit 22 of the embodiment 3.

Figure 5:
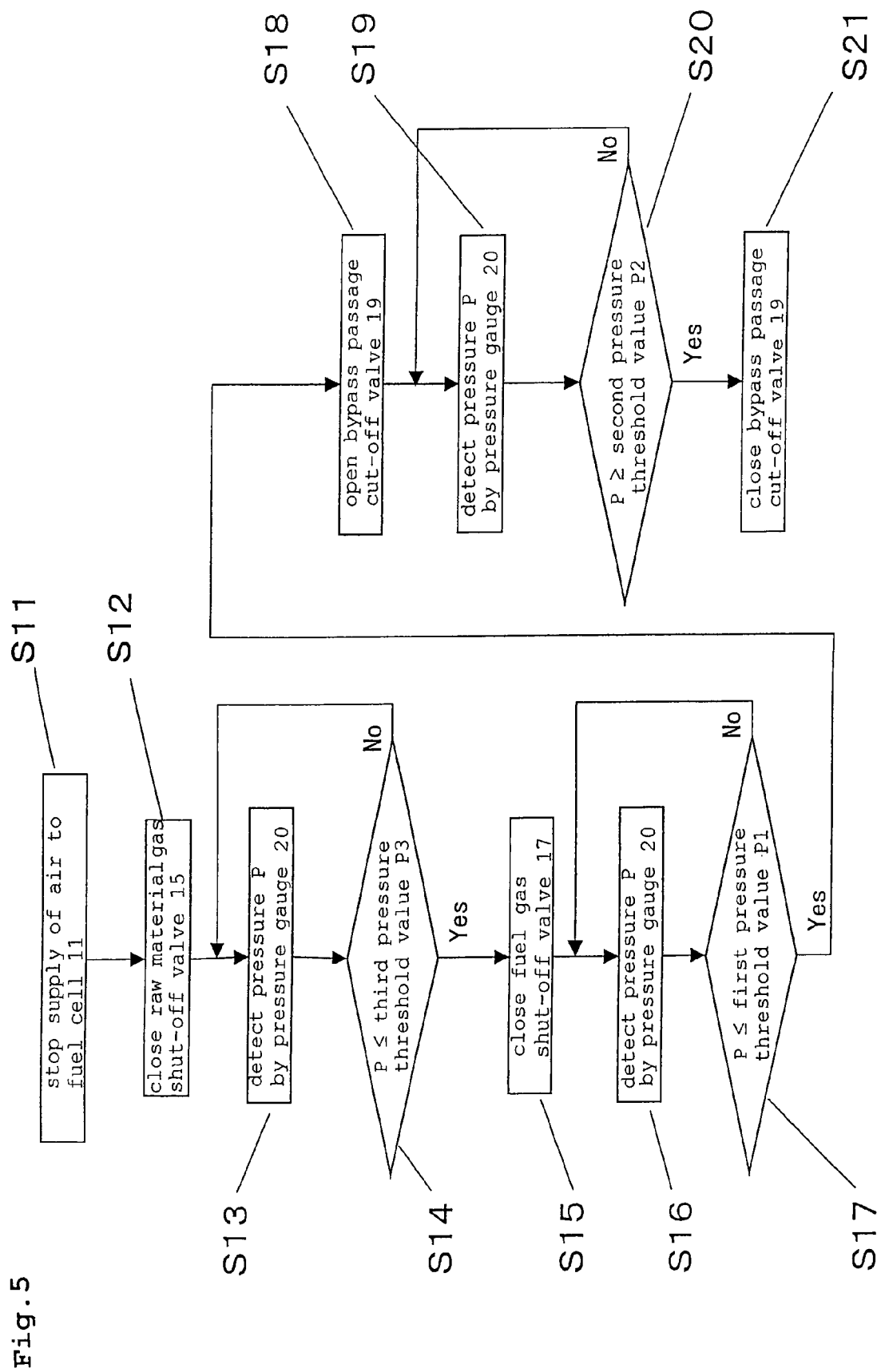
FIG. 5 is a flow chart showing an operation of the fuel cell power generation system of the embodiment 3 according to the present invention.

The manner of operation of the fuel cell power generation system of this embodiment 3 is, in the same manner as the embodiment 2, explained in conjunction with only the manner of operation after the completion of the power generating operation with reference to FIG. 5. Here, FIG. 5 is an exemplary flow chart showing the manner of operation at the time of stopping the fuel cell power generation system of the embodiment 3.

The supply of air which is supplied to the fuel cell 11 is stopped (S11) and, at the same time, the raw material gas shut-off valve 15 is closed (S12) so that the supply of the raw material gas into the fuel treatment device 12 is stopped.

Next, pressure P on an upstream side of the fuel treatment device 12 is detected by the pressure gauge 20 (S13). The detected pressure P is compared with a third pressure threshold value P3 by the control unit 22 (S14). Here, the third pressure threshold value P3 is a predetermined value for, when the internal pressure of a space which is expected to be formed into a hermetically closed space becomes equal to or less than the third pressure threshold value 3P, turning such a space into a hermetically closed state. Accordingly, an upper limit value of the third pressure threshold value P3 is set to a value lower than a high-pressure-side pressure which the fuel cell power generation system can withstand in view of the performance and structure thereof. Further, a lower limit value of the third pressure threshold value P3 is set to a value higher than the first pressure threshold value P1 for preventing the pressure restoring operation before the flow passage is hermetically closed.

When the relationship P≦P3 is established, the fuel gas shut-off valve 17 is closed (S15) and hence, the supply of the fuel gas to the fuel cell 11 is stopped and, at the same time, the fuel treatment device 12, the raw material gas supply passage 14 and a part of the fuel gas supply passage 16 are sealed thus establishing a hermetically closed state.

Subsequently, the pressure gauge 20 detects the pressure P of the hermetically closed space including the fuel treatment device 12 on the upstream side of the fuel treatment device 12 (S16). The detected pressure P is compared with a first pressure threshold value P1 by the control unit 22 (S17).

When the relationship P≦P1 is established, the bypass passage valve 19 is opened (S18) and the raw material gas is supplied to the fuel gas supply passage 16 which is provided upstream of the fuel gas shut-off valve 17 through the fuel-treatment-device bypass passage 18. Due to the supply of the raw material gas to the fuel gas supply passage 16, the pressure of the hermetically closed space including the fuel treatment device 12 can be restored.

Subsequently, when the pressure P is detected (S19) the detected pressure P and a second pressure threshold value P2 are compared with each other by the control unit 22 (S20), and when the relationship P≧P2 is established, the bypass passage valve 19 is closed (S21), and the fuel-treatment-device bypass passage 18 is sealed.

By adopting the constitution and the operating method of the fuel cell power generation system of the above-mentioned embodiment 3, it is possible to further obtain following manner of operation and advantageous effects in addition to the manner of operation and advantageous effects explained in the embodiment 2.

By stopping the supply of the raw material gas and water for reforming for stopping the generation of power, it is possible to stop the generation of hydrogen in the fuel treatment device 12. Further, it is possible to stop the supply of the raw material gas instantaneously by closing the raw material gas shut-off valve 15.

On the other hand, even when the supply of water for reforming is stopped, water which is supplied in the inside of the fuel treatment device 12 immediately before the supply of water is stopped is heated and evaporated by an internal residual heat thereafter. Accordingly, when the fuel gas shut-off valve 17 is closed simultaneously with the stopping of the supply of the raw material gas, pressure in the inside of the hermetically closed space including the fuel treatment device 12 is abnormally increased.

However, in this embodiment 3, the pressure on an upstream side of the fuel treatment device 12 is detected by the pressure gauge 20 and, when the detected pressure assumes a value which is equal to or more than the third pressure threshold value P3 which is the third predetermined threshold value of the present invention, the fuel gas shut-off valve 17 is opened and hence, a fuel gas flow passage to the fuel cell 11 is ensured. In this manner, by discharging the fuel gas which contains the high-pressure water vapor which is heated and evaporated in the inside of the reformer 2 to the fuel cell 11 which is provided downstream of the fuel treatment device 12, it is possible to lower the internal pressure. Further, when the pressure which is detected by the pressure gauge 20 is lowered to a value equal to or less than the third pressure threshold value P3, the fuel gas shut-off valve 17 is closed and hence, it is possible to bring the space including the fuel treatment device 12 into a hermetically closed state.

Embodiment 4

Figure 6:
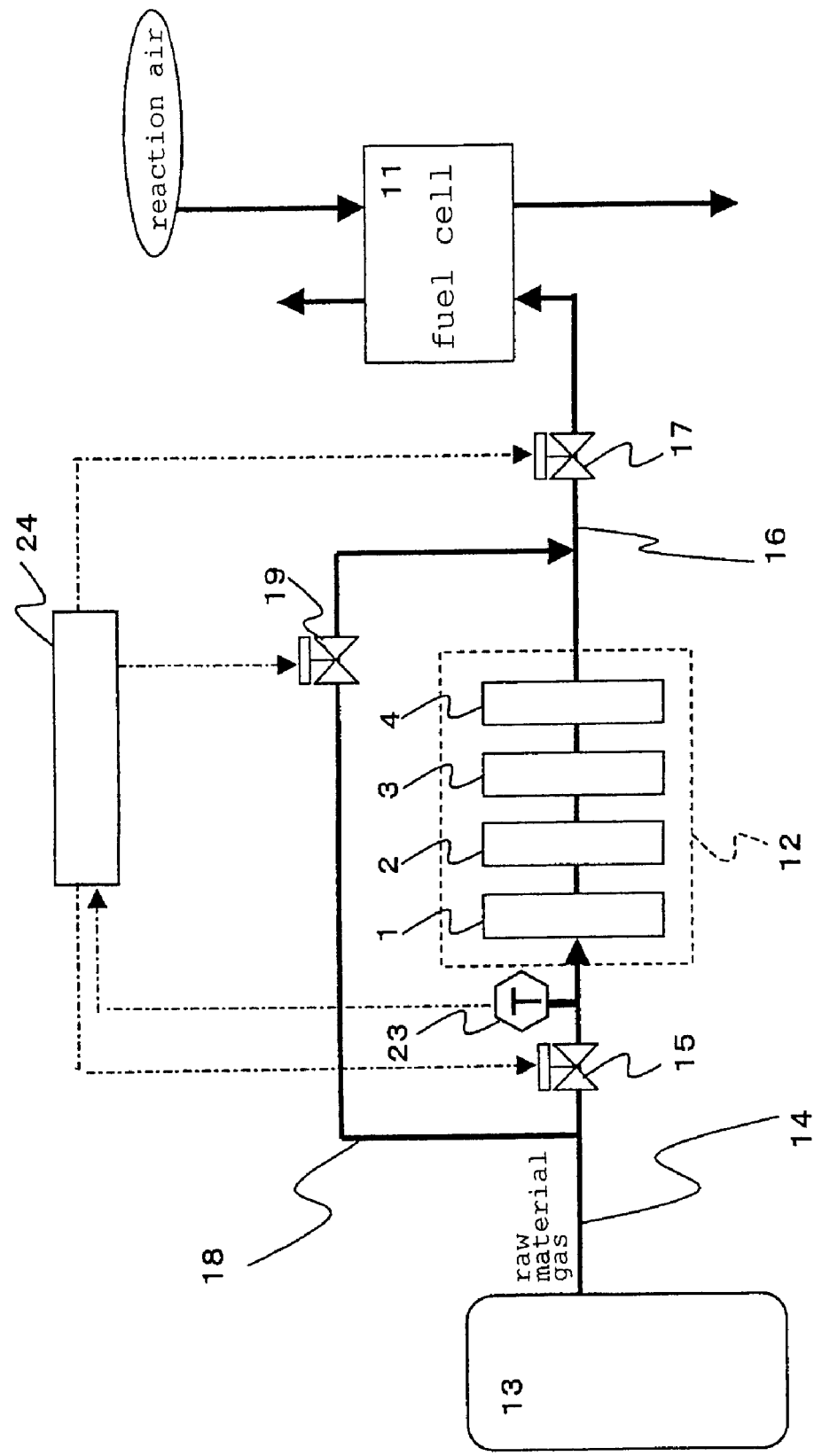
FIG. 6 is a constitutional view showing a fuel cell power generation system of an embodiment 4 according to the present invention.

FIG. 6 is a constitutional view showing a fuel cell power generation system according to an embodiment 4 of the present invention. Units having the identical members and functions with corresponding units shown in FIG. 2 are given the same numerals and their explanation is omitted. The fuel cell power generation system of this embodiment 4 has the same basic constitution as the fuel cell power generation system of the embodiment 2 shown in FIG. 2. However, this embodiment 4 includes, in place of the pressure gauge 20, a temperature detector 23 which detects a temperature of the raw material gas supply passage 14 provided between the raw material gas shut-off valve 15 and the fuel treatment device 12. This embodiment also includes, in place of the control unit 21 of the embodiment 2, a control unit 24 which controls opening/closing of the bypass passage valve 19 in response to a signal from the temperature detector 23. Accordingly, this embodiment 4 is explained by focusing on a point which makes this embodiment different from the embodiment 2. Here, the temperature detector 23 and the control unit 24 of this embodiment 4 indicate one example of a temperature detecting unit and a control unit of the present invention.

Figure 7:
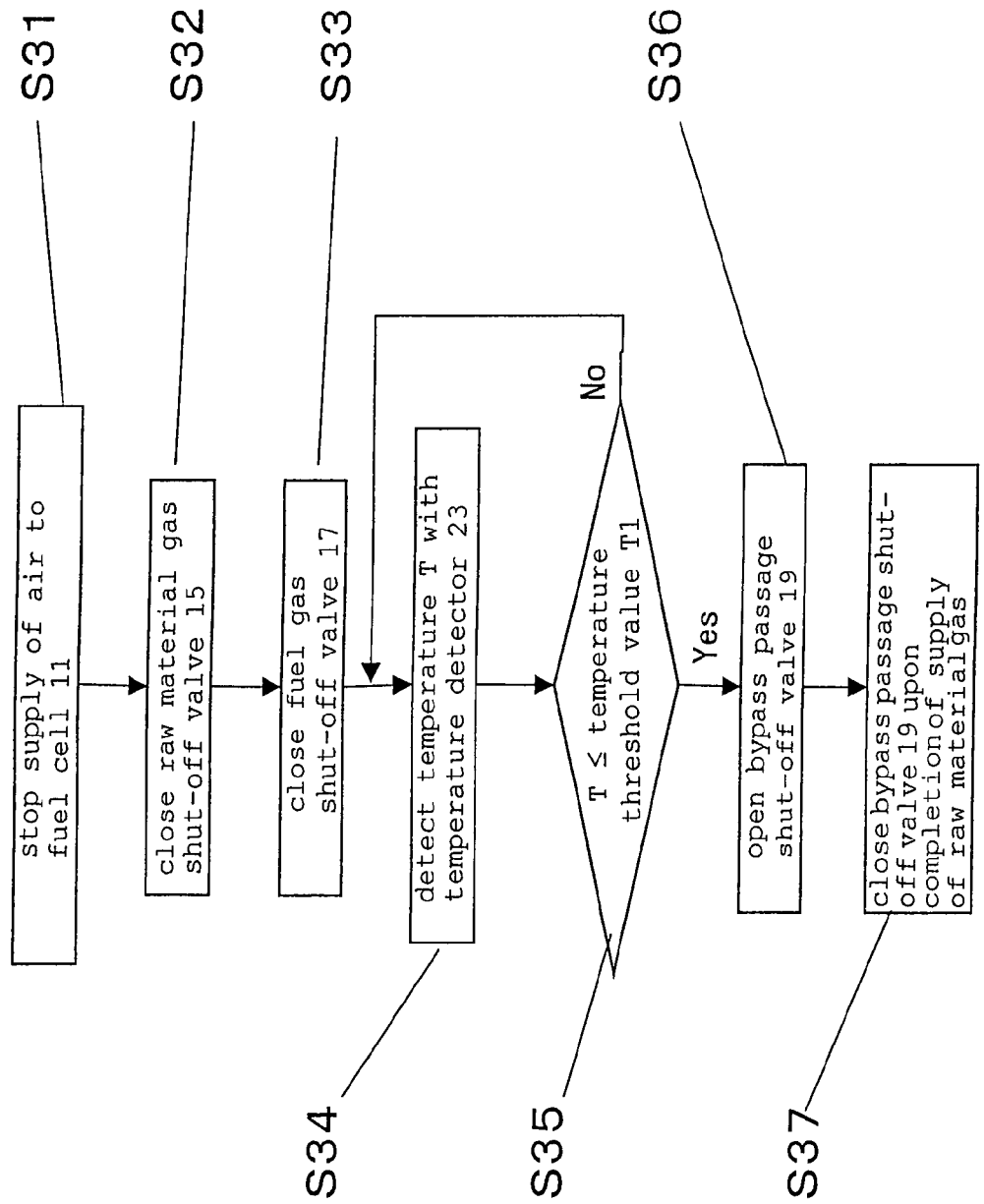
FIG. 7 is a flow chart showing an operation of the fuel cell power generation system of the embodiment 4 according to the present invention.

With respect to the manner of operation of the fuel cell power generation system of this embodiment 4, only the manner of operation after the completion of the power generating operation is explained in conjunction with FIG. 7 in the same manner as the embodiment 2. Here, FIG. 7 is an exemplary flow chart showing the manner of operation at the time of finishing the power generating operation of the fuel cell power generation system of the embodiment 4.

The supply of air which is supplied to the fuel cell 11 is stopped (S31) and, at the same time, the raw material gas shut-off valve 15 is closed (S32) so that the supply of the raw material gas into the fuel treatment device 12 is stopped.

Further, the fuel gas shut-off valve 17 is closed (S33) so that the supply of the fuel gas into the fuel cell 11 is stopped.

Next, a temperature T of the hermetically closed space including the fuel treatment device 12 on an upstream side of the fuel treatment device 12 is detected by the temperature detector 23 (S34). The detected temperature T is compared with a temperature threshold value T1 by the control unit 24 (S35).

When the relationship T≦T1 is established, the bypass passage valve 19 is opened (S36) and the raw material gas is supplied to the fuel gas supply passage 16 which is provided upstream of the fuel gas shut-off valve 17 through the fuel-treatment-device bypass passage 18. When the supply of the raw material gas to the fuel gas supply passage 16 is completed, the bypass passage valve 19 is closed (S37) and the fuel-treatment-device bypass passage 18 is sealed.

By adopting the constitution and the operating method of the fuel cell power generation system of the above-mentioned embodiment 4, it is possible to obtain the following operation and advantageous effects.

When the fuel cell power generation system is stopped, the fuel treatment device 12, the raw material gas supply passage 14 and a portion of the fuel gas supply passage 16 are shut off by the raw material gas shut-off valve 15 and the fuel gas shut-off valve 17 and hence are in a hermetically closed state. Accordingly, along with a lapse of time, an inner temperature of a fuel treatment device 12 or the like is lowered thus giving rise to the lowering of pressure. Further, a water vapor in the fuel gas sealed in the inside of the fuel treatment device 12 or the like is condensed thus giving rise to further lowering of pressure.

Figure 8:
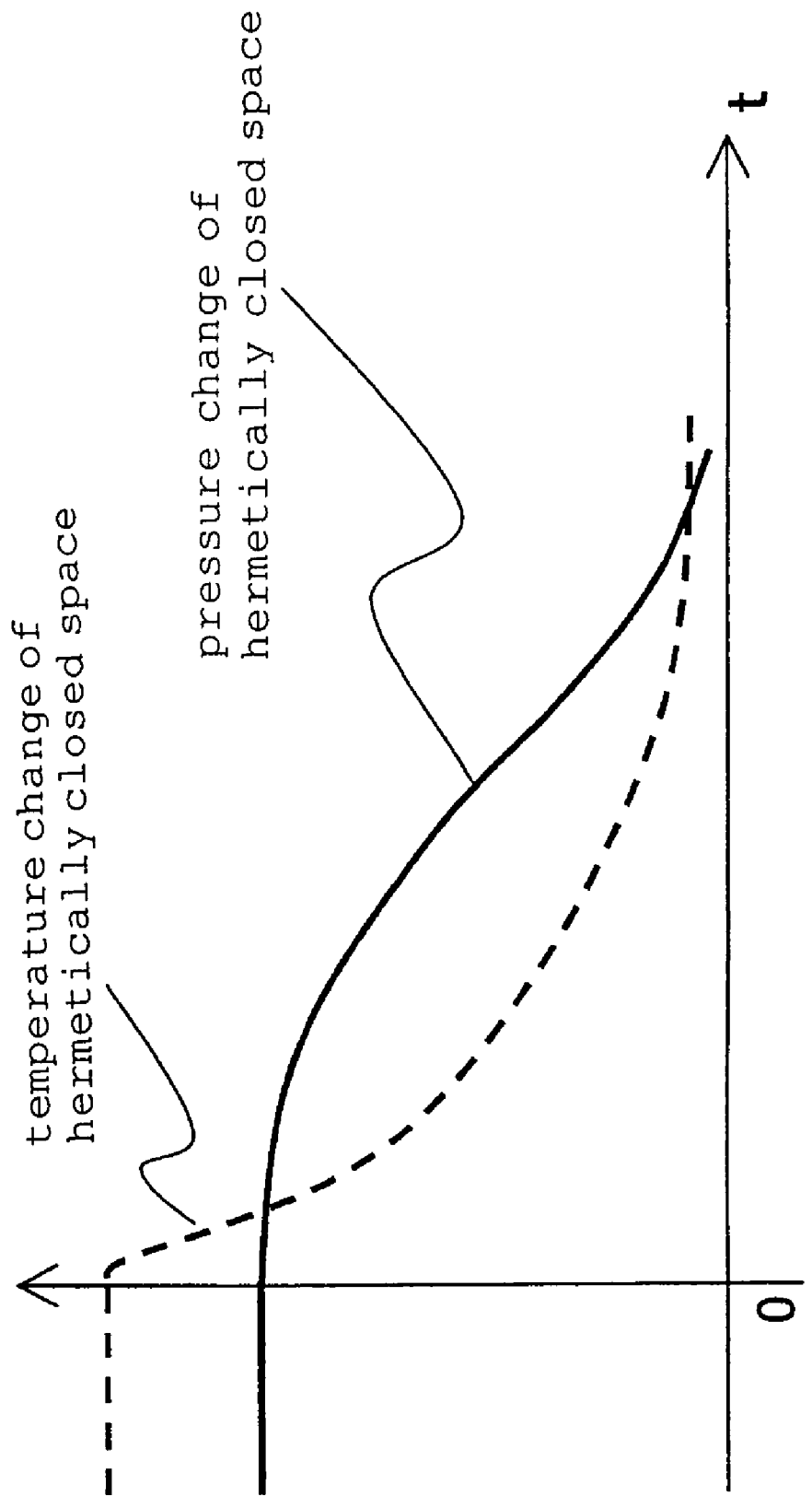
FIG. 8 is a view showing a graph on the relationship between an inner temperature change and a pressure change of a sealed space including a fuel treatment device of the fuel cell power generation system of the embodiment 4 according to the present invention.

FIG. 8 shows a temperature change detected by the temperature detector 23 and a pressure change of the hermetically closed space including the fuel treatment device 12 when the fuel cell power generation system shown in FIG. 6 is stopped. As shown in FIG. 8, along with the lowering of the temperature, the lowering of the pressure progresses. Accordingly, in this embodiment 4, by using the temperature detector 23 in place of the pressure gauge 20 used in the embodiment 2, it is possible to detect the lowering of the pressure in the inside of the hermetically closed space including the fuel treatment device 12.

As described above, in this embodiment 4, the temperature of the above-mentioned hermetically closed space is detected by the temperature detector 23 and, when the temperature is lowered to a value less than the temperature threshold value T1, the raw material gas is supplied to the fuel gas supply passage 16 which is provided upstream of the fuel gas shut-off valve 17 through the fuel-treatment-device bypass passage 18 and, after the completion of the supply of the raw material gas, the bypass passage valve 19 is closed thus sealing the flow passage whereby it is possible to restore the pressure of the hermetically closed space including the fuel treatment device 12. Here, one example of the fourth predetermined threshold value of the present invention corresponds to the temperature threshold value T1 of the embodiment 4.

Further, the reforming catalyst in the reformer 2 precipitates carbon thereon when the reforming catalyst is subjected to the hydrocarbon atmosphere such as methane which exhibits poor water vapor at a temperature of 400° C. or more, and the performance of the catalyst is deteriorated. However, according to this embodiment, the raw material gas is supplied from the downstream of the fuel treatment device 12 corresponding to the lowering of temperature and hence, the raw material gas is supplied to the shift reaction unit 3 and the selective oxidation reaction unit 4 which are arranged downstream of the reformer 2. Accordingly, even when the raw material gas flows in the reformer 2 which is positioned upstream of the shift reaction unit 3 and the selective oxidation reaction unit 4, a flow rate of the raw material gas is extremely small, that is, at a level of the inflow by diffusion and, at the same time, a small quantity of water vapor remains in the inside of the reformer 2 and hence, the performance of the catalyst is not influenced whereby the catalyst can ensure the performance thereof.

Further, although the case in which "the supply of the raw material gas to the fuel gas supply passage 16 by opening the bypass passage valve 19" is performed once is explained in this embodiment 4, this operation is performed "for restoring the pressure in the hermetically closed space including the fuel treatment device 12" and hence, in the control unit 24, a plurality of temperature threshold values T1, T2, T3, . . . a reset and such an operation may be performed plural times in response to temperature signals from the temperature detector 23.

Here, in this embodiment 4, although "the temperature detector 23 is mounted on the raw material gas supply passage 14 arranged between the raw material gas shut-off valve 15 and the fuel treatment device 12", it is sufficient that the temperature detector 23 can detect the temperature of at least the space which includes the fuel treatment device 12 which is hermetically closed by the raw material gas shut-off valve 15 and the fuel gas shut-off valve 17 and hence, the temperature detector 23 may be provided on the fuel gas supply passage 16 which is provided between the fuel treatment device 12 and the fuel gas shut-off valve 17, may be provided on the fuel-treatment-device bypass passage 18 which is provided downstream of the bypass passage valve 19 or may be provided in the inside of the fuel treatment device 12.

Embodiment 5

Figure 9:
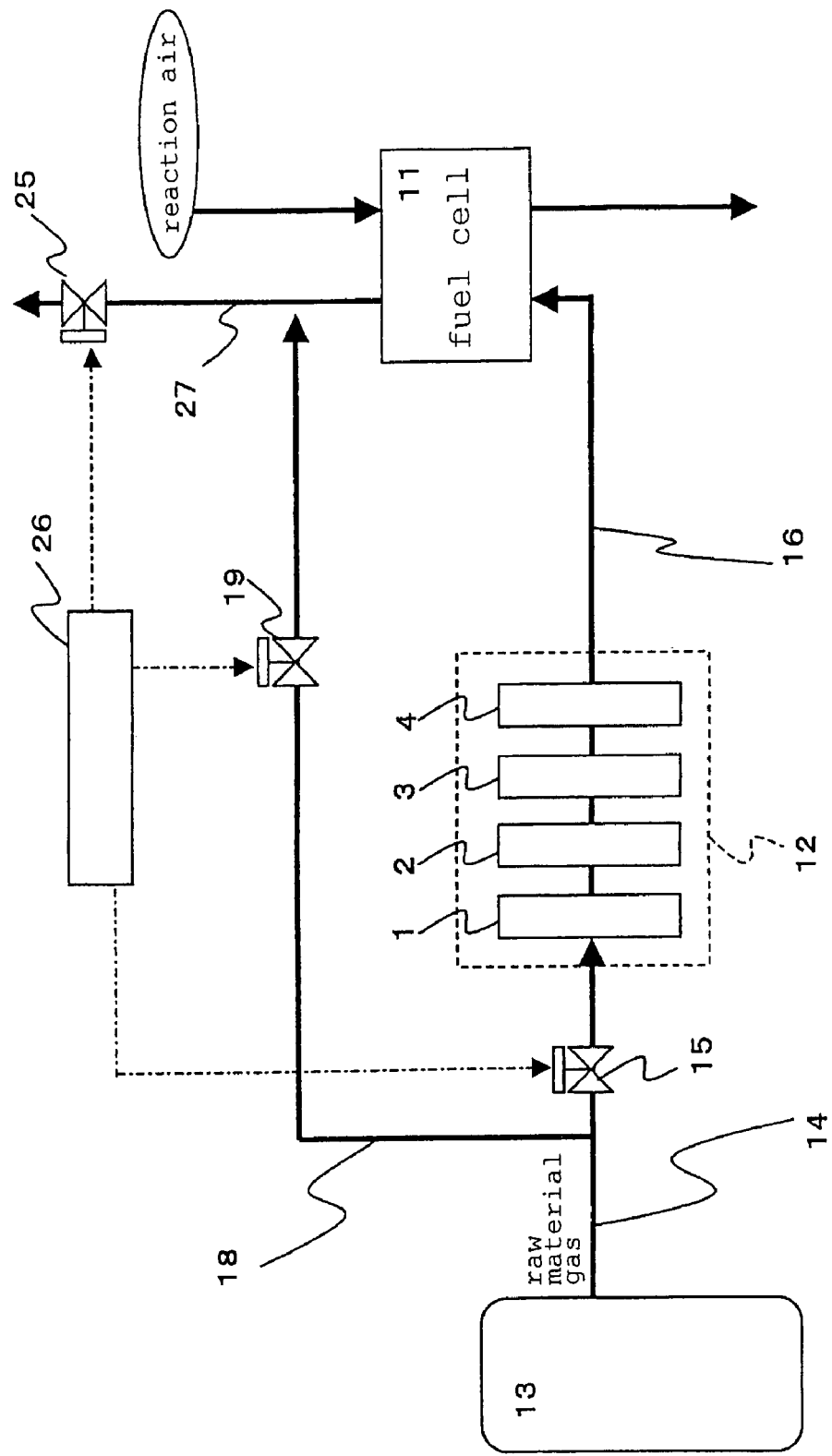
FIG. 9 is a constitutional view showing a fuel cell power generation system of an embodiment 5 according to the present invention.

FIG. 9 is a constitutional view showing a fuel cell power generation system according to an embodiment 5 of the present invention. Units having the identical members and functions with corresponding units shown in FIG. 1 are given the same numerals and their explanation is omitted. The fuel cell power generation system of this embodiment 5 has the same basic constitution as the fuel cell power generation system of the embodiment 1 shown in FIG. 1. However, this embodiment 5 differs from the embodiment 1 with respect to points that a fuel cell outlet shut-off valve 25 is, in place of the fuel gas shut-off valve 17, mounted on a fuel gas discharge passage 27 downstream of the fuel cell 11 with respect to the forward flow direction of the fuel gas as the reference and, at the same time, the fuel treatment device bypass passage 18 is configured to be merged into the fuel gas discharge passage 27. Further, in this embodiment, in place of the control unit 5 of the embodiment 1, the fuel cell power generation system includes a control unit 26 which controls the raw material gas shut-off valve 15, the bypass passage valve 19 and the fuel cell outlet shut-off valve 25. Here, one example of the control unit of the present invention corresponds to the control unit 26 of this embodiment 5 and one example of the second valve of the present invention corresponds to the fuel cell outlet shut-off valve 25 of this embodiment 5.

Since the manner of operation of the fuel cell power generation system of this embodiment 5 at the time of generating power is substantially equal to the corresponding manner of operation of the embodiment 1, the explanation of the manner of operation of the fuel cell power generation system is omitted, and only the manner of operation of the fuel cell power generation system of this embodiment 5 after the completion of the power generating operation is explained.

The supply of air which is supplied to the fuel cell 11 is stopped and, at the same time, the raw material gas shut-off valve 15 is closed so that the supply of the raw material gas into the fuel treatment device 12 is stopped. Further, the fuel cell outlet shut-off valve 25 is closed thus defining the hermetically closed state which seals the space including the fuel cell 11 and the fuel treatment device 12.

Next, the bypass passage valve 19 is opened so that the raw material gas is supplied to the fuel gas discharge passage 27 which is provided upstream of the fuel cell outlet shut-off valve 25 through the fuel-treatment-device bypass passage 18. When the supply of the raw material gas is finished, the bypass passage valve 19 is closed and the fuel-treatment-device bypass passage 18 is sealed.

According to the constitution and the operating method of the fuel cell power generation system according this embodiment 5, it is possible to obtain the following operation and advantageous effects.

When the fuel cell power generation system is stopped, the fuel cell 11, the fuel treatment device 12, the raw material gas supply passage 14, the fuel gas supply passage 16 and a portion of the fuel gas discharge passage 27 are shut off by the raw material gas shut-off valve 15 and the fuel cell outlet shut-off valve 25 and hence, a hermetically closed state is established. Accordingly, along with a lapse of time, an inner temperature of the fuel treatment device 12 or the like is lowered thus giving rise to the lowering of pressure. Further, a water vapor in the fuel gas sealed in the inside of the fuel treatment device 12 or the like is condensed thus giving rise to the further lowering of pressure.

However, according to this embodiment 5, since the raw material gas is supplied to the fuel gas discharge passage 27 which is arranged upstream of the fuel cell outlet shut-off valve 25 through the fuel-treatment-device bypass passage 18, it is possible to restore the pressure in the hermetically closed space including the fuel treatment device 12 through the fuel cell 11 and the fuel gas supply passage 16.

Further, the reforming catalyst of the reformer 2 precipitates carbon thereon when the reforming catalyst is exposed to the hydrocarbon atmosphere such as methane which exhibits the poor water vapor at a temperature of 400° C. or more, and the performance of the catalyst is deteriorated. However, according to this embodiment 5, the raw material gas is supplied from the downstream of the fuel cell 11 and hence, the raw material gas is supplied to the shift reaction unit 3, the selective oxidation reaction unit 4 and the fuel cell 11 which are arranged downstream of the reformer 2 corresponding to the lowering of pressure. Accordingly, even when the raw material gas flows in the reformer 2 which is positioned upstream of the shift reaction unit 3, the selective oxidation reaction unit 4 and the fuel cell 11, a flow rate of the raw material gas is extremely small, that is, at a level of the inflow by diffusion and, at the same time, a small quantity of water vapor remains in the inside of the reformer 2 and hence, the performance of the catalyst is not influenced whereby the catalyst can ensure the performance thereof.

Further, in this embodiment 5, since the raw material gas is supplied from the downstream of the fuel cell 11, the water vapor inside stacks of the fuel cell is purged whereby a water condensation in the inside of an anode passage attributed to the lowering of a temperature of the stacks at the time of performing the system stopping process can be suppressed thus giving rise to an advantageous effect that the flooding in the next operation can be suppressed.

Further, one example of the carbon monoxide decreasing portion of the present invention corresponds to the shift reaction unit 3 and the selective oxidation reaction unit 4 of this embodiment 5; however, one example of the carbon monoxide decreasing portion of the present invention may correspond to only the shift reaction unit.

Embodiment 6

Figure 10:
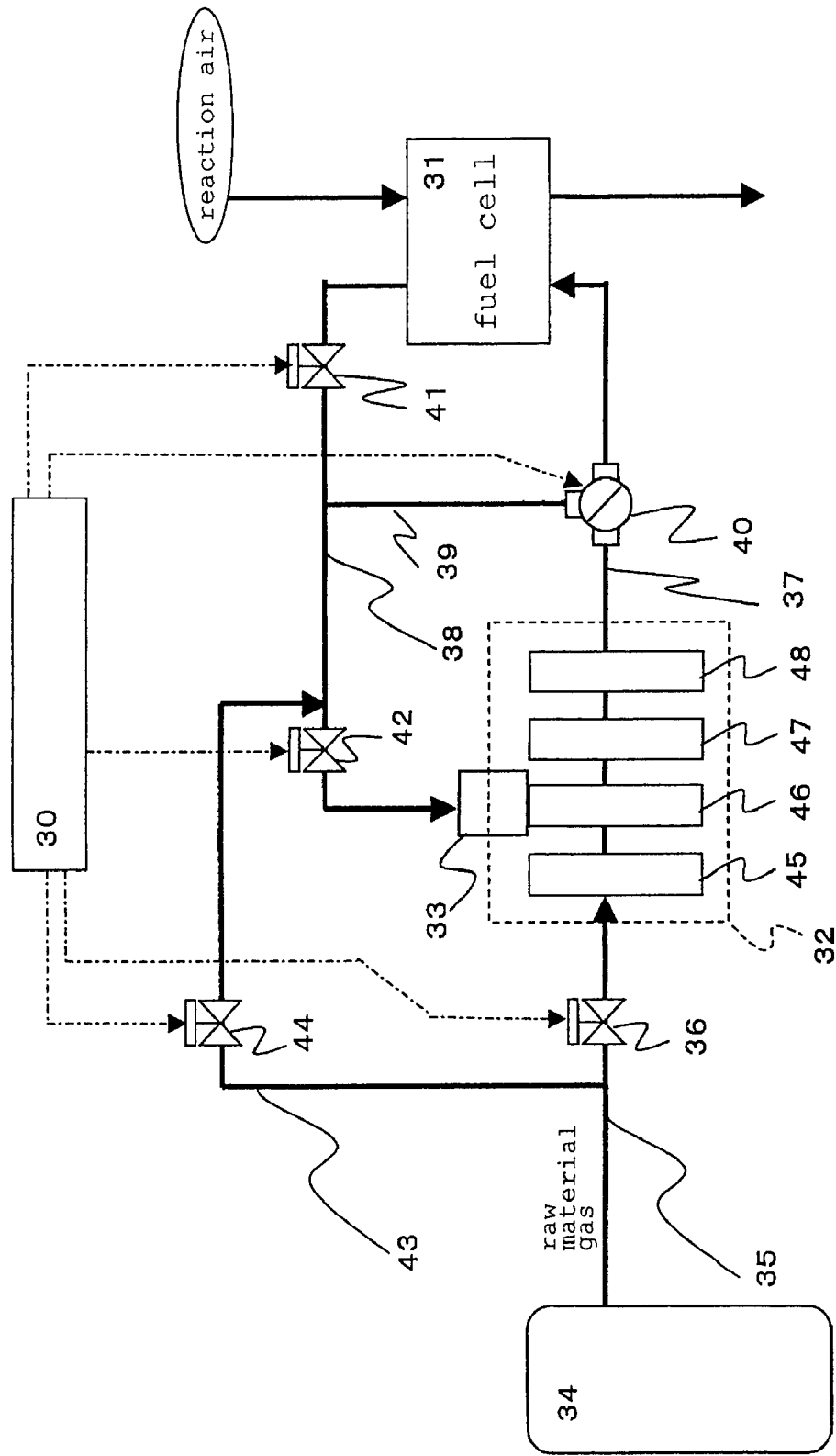
FIG. 10 is a constitutional view showing a fuel cell power generation system of an embodiment 6 according to the present invention.

FIG. 10 is a constitutional view showing a fuel cell power generation system according to an embodiment 6 of the present invention. As shown in FIG. 10, the fuel cell power generation system according to this embodiment 6 includes a fuel cell 31 which generates power using a fuel gas and an oxidizing agent gas, a fuel treatment device 32 which generates a hydrogen-rich fuel gas by performing the water-vapor reforming of a raw material gas, and a raw material supply source 34 which supplies the raw material gas into the fuel treatment device 32. The fuel treatment device 32 includes, in the same manner as the fuel treatment device 12 in the embodiment 1, a desulfurizing unit 45, a reformer 46, a shift reaction unit 47, and a selective oxidation reaction unit 48. The fuel treatment device 32 further includes a burner 33 which heats the reformer 46.

Further, the fuel cell power generation system includes a raw material gas supply passage 35 which supplies the raw material gas to the fuel treatment device 32 from the raw material supply source 34, a fuel gas supply passage 37 which supplies the fuel gas to the fuel cell 31 from the fuel treatment device 32 and a fuel gas discharge passage 38 which supplies the fuel gas which is not used for the generation of power in the fuel cell 31 to the burner 33. Further, the fuel cell power generation system includes a fuel cell bypass passage 39 which connects these fuel gas supply passage 37 and the fuel gas discharge passage 38 and supplies the fuel gas to the fuel gas discharge passage 38 by bypassing the fuel cell 31.

Further, a raw material gas shut-off valve 36 which performs the supply/shut-off of the raw material gas with respect to the fuel treatment device 32 is provided on the raw material gas supply passage 35, while a fuel flow passage switching valve 40 which switches over the fuel gas to a fuel cell 31 side or a fuel cell bypass passage 39 side is provided at a portion where the fuel cell bypass passage 39 and the fuel gas supply passage 37 are merged with each other. Further, a fuel cell outlet valve 41 which prevents a gas backflow from the fuel cell 11 at the time of stopping the fuel cell power generation system is mounted on a fuel gas discharge passage 38 arranged between the portion where the fuel cell bypass passage 39 and the fuel gas discharge passage 38 are merged with each other and the fuel cell 31. Further, a fuel gas discharge passage valve 42 which performs the supply/shut-off of the fuel gas to the burner 33 and prevents a gas backflow of air or the like from a burner 33 at the time of stopping the fuel cell power generation system is provided on the fuel gas discharge passage 38 arranged between the portion where the fuel cell bypass passage 39 and the fuel gas discharge passage 38 are merged with each other and the burner 33.

The fuel cell power generation system includes a fuel-treatment-device bypass passage 43 which branches the raw material gas which is supplied from the raw material supply source 34 from the raw material gas supply passage 35 which is arranged upstream of the raw material gas shut-off valve 36 and merges the raw material gas into the fuel gas in the fuel gas discharge passage 38 which is arranged upstream of the fuel gas discharge passage valve 42 and downstream of the fuel cell outlet valve 41. On the fuel-treatment-device bypass passage 43, a bypass passage valve 44 which performs the supply/shut-off of the raw material gas to the fuel-treatment-device bypass passage 43 is mounted.

Further, the fuel cell power generation system includes a control unit 30 which controls the raw material gas shut-off valve 36, the fuel flow passage switching valve 40, the fuel cell outlet valve 41, the fuel gas discharge passage valve 42, and the bypass passage valve 44.

Here, one example of the first raw material gas supply passage of the present invention corresponds to the raw material gas supply passage 35 of this embodiment 6, and one example of the first valve of the present invention corresponds to a raw material gas shut-off valve 36 of the embodiment 6. One example of the second valve of the present invention corresponds to the fuel gas discharge passage valve 42 of the embodiment 6. Further, one example of the second raw material gas supply passage of the present invention corresponds to the fuel-treatment-device bypass passage 43 of the embodiment 6, and one example of a third valve of the present invention corresponds to the bypass passage valve 44 of the embodiment 6. Further, one example of the control unit of the present invention corresponds to the control unit 30 of the embodiment 6.

Further, one example of the heating unit of the present invention corresponds to the burner 33 in this embodiment 6 and heats the reformer 46. However, the heating unit may also heat the shift reaction unit 47, and a selective oxidation reaction unit 48.

Further, in the embodiment 6, one example of the flow passage which is closed by the first valve and the second valve of the present invention corresponds to the fuel treatment device 32, the fuel cell bypass passage 39 and portions of the raw material gas supply passage 35, the fuel gas supply passage 37 and the fuel gas discharge passage 38 which are shut off by the raw material gas shut-off valve 36, fuel flow passage switching valve 40 and the fuel gas discharge passage valve 42. Hereinafter, the flow passage is also referred to as a hermetically closed space including the fuel treatment device 32.

Further, as the raw material gas, methane, a natural gas, a city gas or the like may be used. Further, as the raw material supply source 34, a cylinder in which a carbon-hydroxide-based gas such as methane, a natural gas or the like is filled or piping for a city gas or the like may be used.

Hereinafter, the manner of operation of the fuel cell power generation system of this embodiment 6 having the above-mentioned constitution is explained.

First of all, the manner of operation of the fuel cell power generation system of the embodiment 6 at the time of generating power is explained.

By opening the raw material gas shut-off valve 36 and the fuel gas discharge passage valve 42, by closing the fuel cell outlet valve 41 and the bypass passage valve 44, and by changing over the fuel flow passage switching valve 40 to the fuel cell bypass passage 39 side, the raw material gas in the raw material supply source 34 is supplied to the fuel treatment device 32 through the raw material gas supply passage 35. When the raw material gas is supplied to the fuel treatment device 32, a sulfur component in the raw material gas is removed in the desulfurizing unit 45, and then it is subjected to a reform reaction in the reformer 46 with water vapor under a high temperature of 600° C. or more thus forming a hydrogen-rich fuel gas. Then, in the shift reaction unit 47 and the selective oxidation reaction unit 48 of the fuel treatment device 32, carbon monoxide which is contained in the fuel gas is removed to assume the concentration which does not damage a catalyst of the fuel cell 31.

However, the concentration of carbon monoxide in the fuel gas is high at the time of starting the fuel treatment device 32 and hence, the fuel gas which flows into the fuel gas supply passage 37 is supplied to the fuel cell bypass passage 39 side by the fuel flow passage switching valve 40 and is supplied to the burner 33 through the fuel gas discharge passage 38. The fuel gas which is supplied to the burner 33 is burnt as a heating source of the fuel treatment device 32.

On the other hand, when the concentration of carbon monoxide in the fuel gas is decreased, the fuel flow passage switching valve 40 is switched to the fuel cell 31 side and the fuel cell outlet valve 41 is opened. The hydrogen-rich fuel gas whose concentration of carbon monoxide is sufficiently decreased by the fuel treatment device 32 is supplied to the fuel cell 31 through the fuel gas supply passage 37 and serves to generate power together with supplied air. Here, from the fuel cell 31, the fuel gas which is not used for the generation of power is discharged from a discharge side of the fuel cell 31 and is supplied to the burner 33 through the fuel gas discharge passage 38 and is burnt.

Next, the manner of operation after the completion of the generation of power by the fuel cell power generation system in the embodiment 6 is explained. Here, along with the explanation of the manner of operation after the completion of the generation of power by the fuel cell power generation system of the embodiment 6, one embodiment of the operating method of the present invention is also explained. Further, the same goes for other embodiments described hereinafter.

The supply of air to the fuel cell 31 is stopped and, at the same time, the raw material gas shut-off valve 36 is closed so that the supply of the raw material gas to the fuel treatment device 32 is stopped. Further, the fuel flow passage switching valve 40 is switched to the fuel cell bypass passage 39 side, the fuel cell outlet valve 41 is closed and the supply of the fuel gas to the fuel cell 31 is stopped thus allowing the fuel cell 31 to assume a hermetically closed state. Still further, the fuel gas discharge passage valve 42 is closed and hence, the supply of the fuel gas to the burner 33 is stopped and, at the same time, the space including the fuel treatment device 32 assumes a hermetically closed state.

Next, the bypass passage valve 44 is opened so that the raw material gas is supplied to the fuel gas discharge passage 38 which is provided upstream of the fuel gas discharge passage valve 42 through the fuel-treatment-device bypass passage 43. When the supply of the raw material gas is finished, the bypass passage valve 44 is closed and the fuel-treatment-device bypass passage 43 is sealed.

According to the constitution and the operating method of the fuel cell power generation system in this embodiment 6, it is possible to obtain the following operation and advantageous effects.

When the fuel cell power generation system is stopped, the fuel treatment device 32, the fuel cell bypass passage 39 and the portions of the raw material gas supply passage 35, the fuel gas supply passage 37 and the fuel gas discharge passage 38 are shut off by the raw material gas shut-off valve 36, the fuel flow passage switching valve 40 and the fuel gas discharge passage valve 42 and hence, a hermetically closed state is established. Accordingly, along with a lapse of time, an inner temperature of the fuel treatment device 32 or the like is lowered thus giving rise to the lowering of pressure. Further, water vapor in the fuel gas sealed in the inside of the fuel treatment device 32 or the like is condensed thus giving rise to the further lowering of pressure. However, in this embodiment 6, the raw material gas is supplied to the fuel gas discharge passage 38 which is provided upstream of the fuel gas discharge passage valve 42 through the fuel treatment device bypass passage 43 and hence, it is possible to restore the pressure in the hermetically closed space including the fuel treatment device 32.

Further, the reforming catalyst of the reformer 46 precipitates carbon thereon when the reforming catalyst is exposed to the hydrocarbon atmosphere such as methane which exhibits the poor water vapor at a temperature of 400° C. or more, and the performance of the catalyst is deteriorated. However, according to this embodiment 6, the raw material gas is supplied corresponding to the lowering of pressure from the vicinity of an upstream of the fuel gas discharge passage valve 42 which is remotely displaced from the fuel treatment device 32 along piping. Here, on the flow passage ranging from the reformer 46 which is provided with the reforming catalyst to the fuel treatment device bypass passage 43 to which the raw material gas is supplied, the shift reaction unit 47, the selective oxidation reaction unit 48, the portion of the fuel gas supply passage 37, the fuel cell bypass passage 39 and the portion of the fuel gas discharge passage 38 are arranged and hence, even when the raw material gas flows in the reformer 46, a flow rate of the raw material gas is extremely small, that is, at a level of the inflow by diffusion, and a small quantity of water vapor remains in the inside of the reformer 46 and hence, the performance of the catalyst is not influenced whereby the catalyst can ensure the performance thereof.

Here, at the time of changing over the flow passage from the fuel cell bypass passage 39 to the fuel cell 31, when there exists a large difference in a pressure loss between the fuel cell side and the bypass passage side, a flow rate of the gas which is supplied to the burner 33 is sharply changed and hence, the combustion stability is deteriorated. Accordingly, normally, the bypass passage 39 is formed of a flow passage having an extremely small cross-sectional area so that the pressure loss of the bypass passage 39 side becomes equal to the pressure loss of the fuel cell side. Accordingly, when the fuel gas including water vapor remains in the inside of the bypass passage 39, there may arise a drawback such as water clogging when the fuel cell power generation system is started next time and a possibility of breaking the bypass passage 39 attributed to freezing in the inside of the bypass passage 39.

Accordingly, as described in the embodiment 6, at the time of performing pressure tension in supplying the raw material gas, the raw material gas such as a city gas containing less moisture than the residual fuel gas is supplied from the fuel gas discharge passage 38 and is injected to the hydrogen generating device via the bypass passage 39 whereby moisture in the inside of the bypass passage 39 is discharged thus realizing the advantageous effect that a possibility of water clogging or breaking by freezing is decreased. With respect to the above-mentioned advantageous effect, the same goes for other embodiments described hereinafter.

Further, in this embodiment, the raw material gas such as the city gas containing small moisture is supplied as described above thus also realizing the advantageous effect that the ignition property of the burner 33 is enhanced at the time of burning the residual gas when the fuel cell power generation system is started next time.

Here, embodiments described hereinafter also can enjoy the above-mentioned advantageous effects such as the prevention of water clogging and freezing in the inside of the bypass passage 39 and the enhancement of the ignition property.

Further, although one example of the carbon monoxide reducing unit of the present invention corresponds to the shift reaction unit 3 and the selective oxidation reaction unit 4 of the embodiment 1, the carbon monoxide reducing unit may corresponds to only the shift reaction unit. Further, the downstream end of the fuel-treatment-device bypass passage 43 may be connected to a portion between the shift reaction unit 47 and the selective oxidation reaction unit 48 which constitutes one example of the middle portion of the carbon monoxide reducing unit of the present invention, a portion between the selective oxidation reaction unit 48 and the fuel flow passage switching valve 40, a portion on the fuel cell bypass passage 39 or a portion between the fuel cell outlet valve 41 and the fuel gas discharge passage valve 42. In short, even when the raw material gas which is supplied through the fuel-treatment-device bypass passage 43 flows in the inside of the reformer 46, a predetermined capacity should be provided downstream side of the reformer 46 such that only a quantity of the raw material gas which does not influence the performance of the catalyst flows in the inside of the reformer 46.

Here, although the case in which "the supply of the raw material gas to the fuel gas discharge passage 38 by opening the bypass passage valve 44" is performed once is explained with respect to this embodiment 6, this operation is performed "for restoring the pressure in the hermetically closed space including the fuel treatment device 32" and hence, such an operation may be performed plural times.

Embodiment 7

Figure 11:
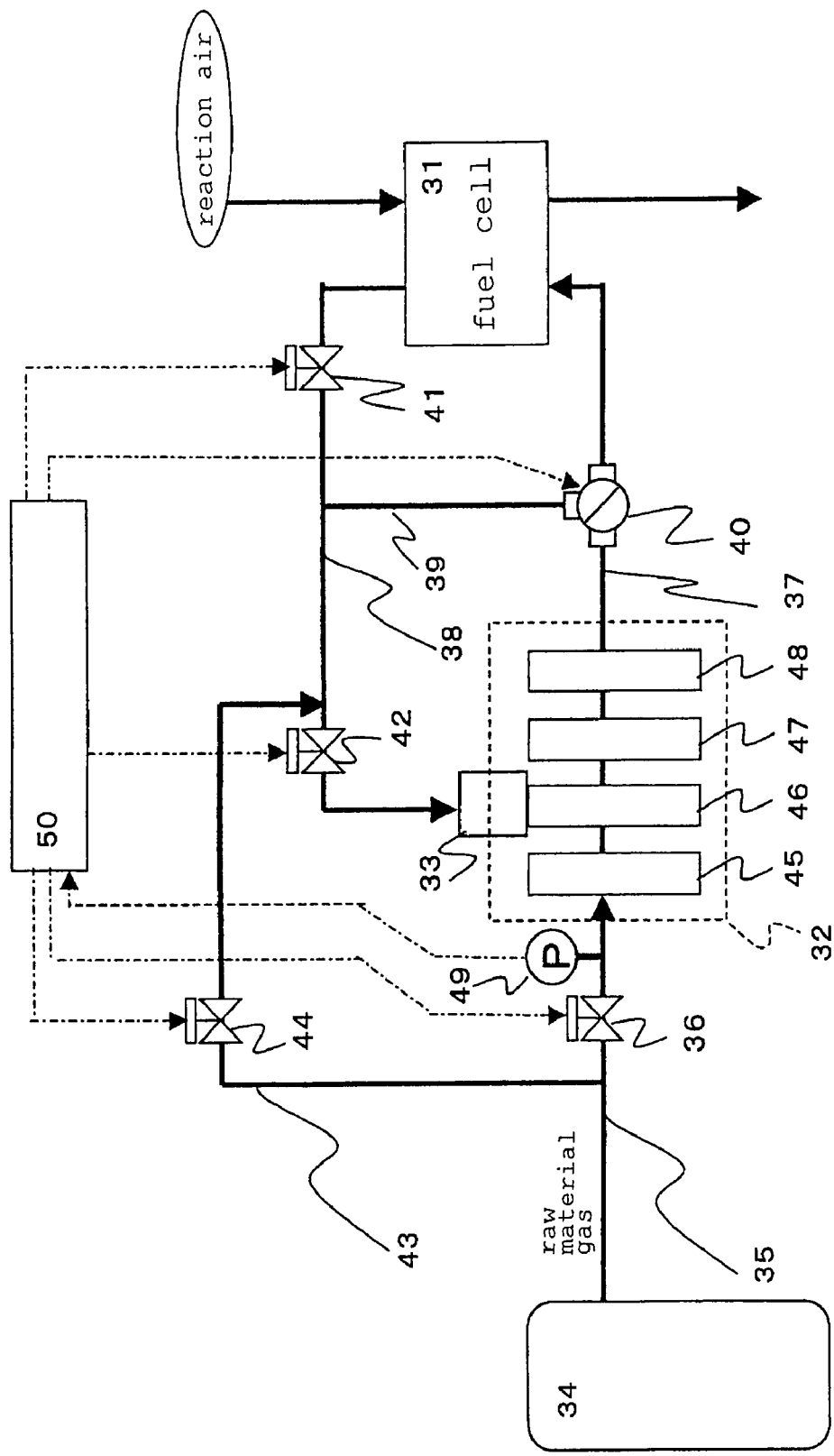
FIG. 11 is a constitutional view showing a fuel cell power generation system of an embodiment 7 according to the present invention.

FIG. 11 is a constitutional view showing the fuel cell power generation system according to an embodiment 7 of the present invention. Units having the identical members and functions with corresponding units shown in FIG. 10 are given the same numerals and their explanation is omitted. The fuel cell power generation system of this embodiment 7 has the same basic constitution as the fuel cell power generation system of the embodiment 6 shown in FIG. 10. However, this embodiment 7 differs from the embodiment 6 with respect to a point that the fuel cell power generation system includes a pressure gauge 49 which detects a pressure of the raw material gas supply passage 35 arranged between the raw material gas shut-off valve 36 and the fuel treatment device 32, and a control unit 50 which controls an open/close operation of the bypass passage valve 44 upon receiving a signal from the pressure gauge 49 in place of the control unit 30 of the embodiment 6. Here, the pressure gauge 49 and the control unit 50 of this embodiment 7 correspond to one example of the pressure detecting unit and the control unit of the present invention.

Figure 12:
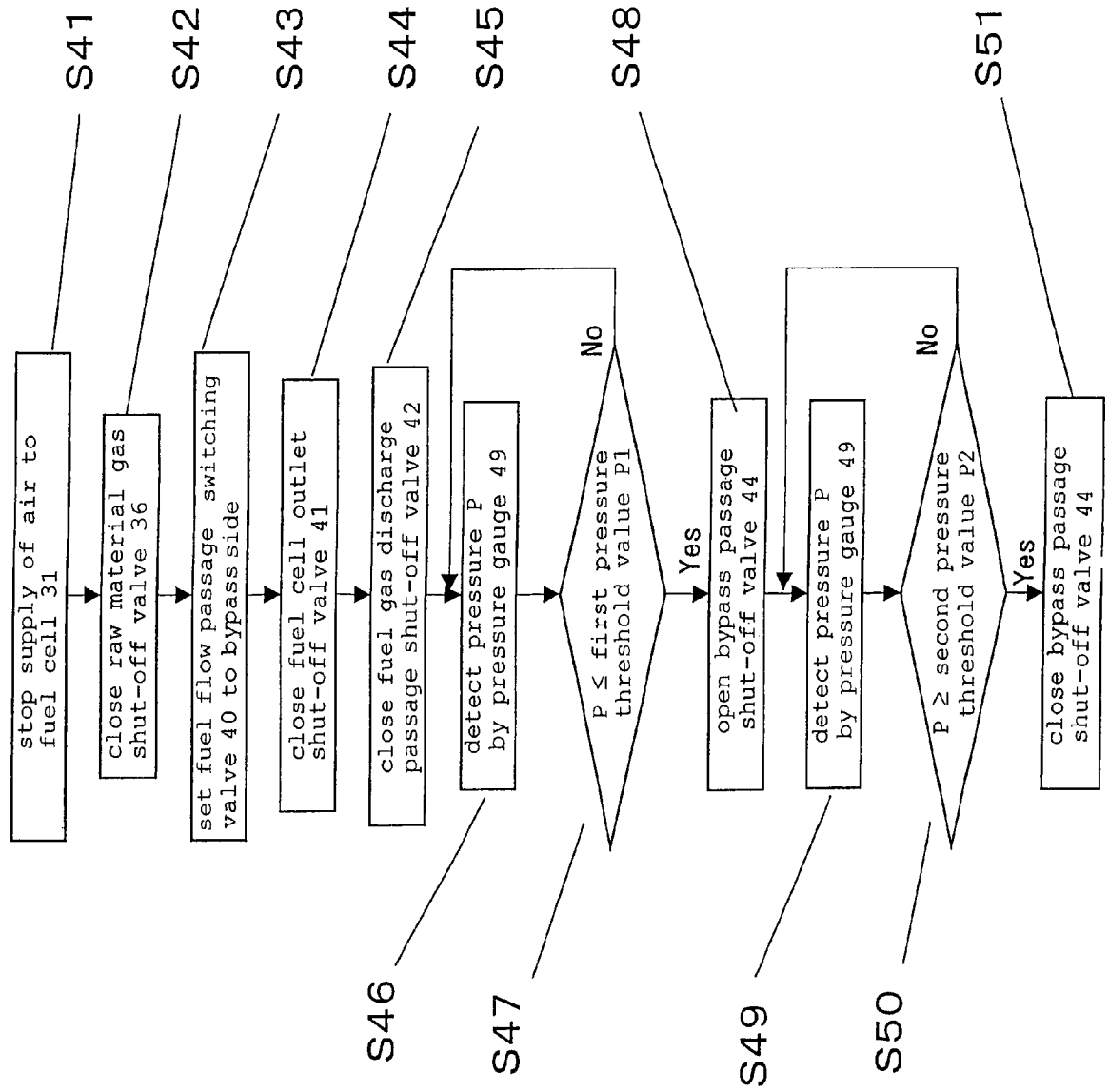
FIG. 12 is a flow chart showing an operation of the fuel cell power generation system of the embodiment 7 according to the present invention.

Since the manner of operation of the fuel cell power generation system of this embodiment 7 at the time of generating power is substantially equal to the corresponding manner of operation of the embodiment 6, the explanation of the manner of operation of the fuel cell power generation system is omitted, and only the manner of operation of the fuel cell power generation system of this embodiment 7 after the completion of the power generating operation is explained in conjunction with FIG. 12. Here, FIG. 12 is an exemplary flow chart showing the manner of operation at the time of stopping the fuel cell power generation system in this embodiment 7.

The supply of air to the fuel cell 31 is stopped (S41) and, at the same time, the raw material gas shut-off valve 36 is closed so that the supply of the raw material gas to the fuel treatment device 32 is stopped (S42). Further, the fuel flow passage switching valve 40 is changed over to the bypass side (S43), the fuel cell outlet valve 41 is closed (S44), the supply of the fuel gas to the fuel cell 31 is stopped thus allowing the fuel cell 31 to assume a hermetically closed state.

Further, the fuel gas discharge passage valve 42 is closed (S45) and hence, the supply of the fuel gas to the burner 33 is stopped and, at the same time, the space including the fuel treatment device 32 assumes a hermetically closed state.

A pressure P of the hermetically closed space including the fuel treatment device 32 on an upstream side of the fuel treatment device 32 is detected by the pressure gauge 49 (S46). The detected pressure P is compared with a first pressure threshold value P1 by the control unit 50 (S47).

Here, when the relationship $P \leq P1$ is established, the bypass passage valve 44 is opened (S48) and the raw material gas is supplied to the fuel gas discharge passage 38 which is provided upstream of the fuel gas discharge passage valve 42 through the fuel-treatment-device bypass passage 43. Due to the supply of the raw material gas to the fuel gas discharge passage 38, the pressure of the hermetically closed space including the fuel treatment device 32 can be restored.

Sequentially, the pressure P is detected (S49) and the detected pressure P is compared with the second pressure threshold value P2 by the control unit 50 (S50), and when the relationship $P \geq P2$ is established, the bypass passage valve 44 is closed (S51) and the fuel treatment device bypass passage 43 is sealed.

By adopting the constitution and the operating method of the fuel cell power generation system of the above-mentioned embodiment 7, it is possible to obtain the following operation and advantageous effects.

When the fuel cell power generation system is stopped, the fuel treatment device 32, the fuel cell bypass passage 39 and the portions of the raw material gas supply passage 35, the fuel gas supply passage 37 and the fuel gas discharge passage 38 are shut off by the raw material gas shut-off valve 36, the fuel flow passage switching valve 40 and the fuel gas discharge passage valve 42 and hence, a hermetically closed state is established. Accordingly, along with a lapse of time, an inner temperature of the fuel treatment device 32 or the like is lowered thus giving rise to the lowering of pressure. Further, water vapor in the fuel gas sealed in the inside of the fuel treatment device 32 or the like is condensed thus giving rise to the further lowering of pressure. However, in this embodiment 7, the pressure of the above-mentioned hermetically closed space including the fuel treatment device 32 is detected by the pressure gauge 49, and when the pressure assumes a value equal to or less than the first pressure threshold value P1, the raw material gas is supplied to the fuel gas discharge passage 38 which is provided upstream of the fuel gas discharge passage 42 through the fuel-treatment-device bypass passage 43. Then, when the pressure detected by the pressure gauge 49 due to the supply of the raw material gas assumes a value equal to or more than the second pressure threshold value P2, the bypass passage valve 44 is closed and the flow passage sealing is performed and hence, it is possible to realize the restoration of the pressure of the hermetically closed space including the fuel treatment device 32.

Further, the reforming catalyst of the reformer 46 precipitates carbon thereon when the reforming catalyst is exposed to the hydrocarbon atmosphere such as methane which exhibits the poor water vapor at a temperature of 400° C. or more, and the performance of the catalyst is deteriorated. However, according to this embodiment 7, the raw material gas is supplied corresponding to the lowering of pressure from the vicinity of an upstream of the fuel gas discharge passage valve 42 which is remotely displaced from the fuel treatment device 32 along piping. Here, on the flow passage ranging from the reformer 46 which is provided with the reforming catalyst to the fuel treatment device bypass passage 43 to which the raw material gas is supplied, the shift reaction unit 47, the selective oxidation reaction unit 48, the portion of the fuel gas supply passage 37, the fuel cell bypass passage 39 and the portion of the fuel gas discharge passage 38 are arranged and hence, even when the raw material gas flows in the reformer 46, a flow rate of the raw material gas is extremely small, that is, at a level of the inflow by diffusion, and a small quantity of water vapor remains in the inside of the reformer 46 and hence, the performance of the catalyst is not influenced whereby the catalyst can ensure the performance thereof.

Here, although the case in which "the supply of the raw material gas to the fuel gas discharge passage 38 by opening the bypass passage valve 44" is performed once is explained with respect to this embodiment 7, this operation is performed "for restoring the pressure in the hermetically closed space including the fuel treatment device 32" and hence, such an operation may be performed plural times in response to a pressure signal from the pressure gauge 49 in the control unit 50.

Further, it is preferable to set the above-mentioned first pressure threshold value P1 and the second pressure threshold value P2 such that the relationship $P2 \geq P1$ is established. This is because that such relationship ensures the sufficient supply of the raw material gas. Further, it is preferable to set the above-mentioned first pressure threshold value P1 such that the relationship $P1 \geq 0$ is established. This is because that such relationship can surely prevent the generation of the negative pressure in the hermetically closed space. Further, when a city gas for general household use is used as the raw material gas, since the gas pressure is 1.0 kPa to 2.5 kPa at a gauge pressure, it is preferable to set the second pressure threshold value P2 to satisfy the relationship $1.0 \geq P2$. This is because that such relationship can surely realize the passage sealing after the raw material gas is supplied. Here, one example of the first predetermined threshold value of the present invention corresponds to the first pressure threshold value P1 of the embodiment 7, and one example of the second predetermined threshold value of the present invention corresponds to the second pressure threshold value P2 of the embodiment 7.

Further, in the embodiment 7, "a pressure gauge 49 is provided in the raw material gas supply passage 35 which is arranged between the raw material gas shut-off valve 36 and the fuel treatment device 32", however, provided that the pressure gauge 49 can detect at least a pressure of the space including the fuel treatment device 32 which is hermetically closed by the raw material gas shut-off valve 36 and the fuel gas discharge passage valve 42, the pressure gauge 49 may be mounted in the fuel gas supply passage 37 arranged between the fuel treatment device 32 and the fuel flow passage switching valve 40. Further, the pressure gauge 49 may be mounted in the fuel-treatment-device bypass passage 43 arranged downstream of the bypass passage valve 44, in the fuel cell bypass passage 39 or in the fuel gas discharge passage 38 arranged between the fuel cell outlet valve 41 and the fuel gas discharge passage valve 42 or in the inside of the fuel treatment device 32.

Embodiment 8

Figure 13:
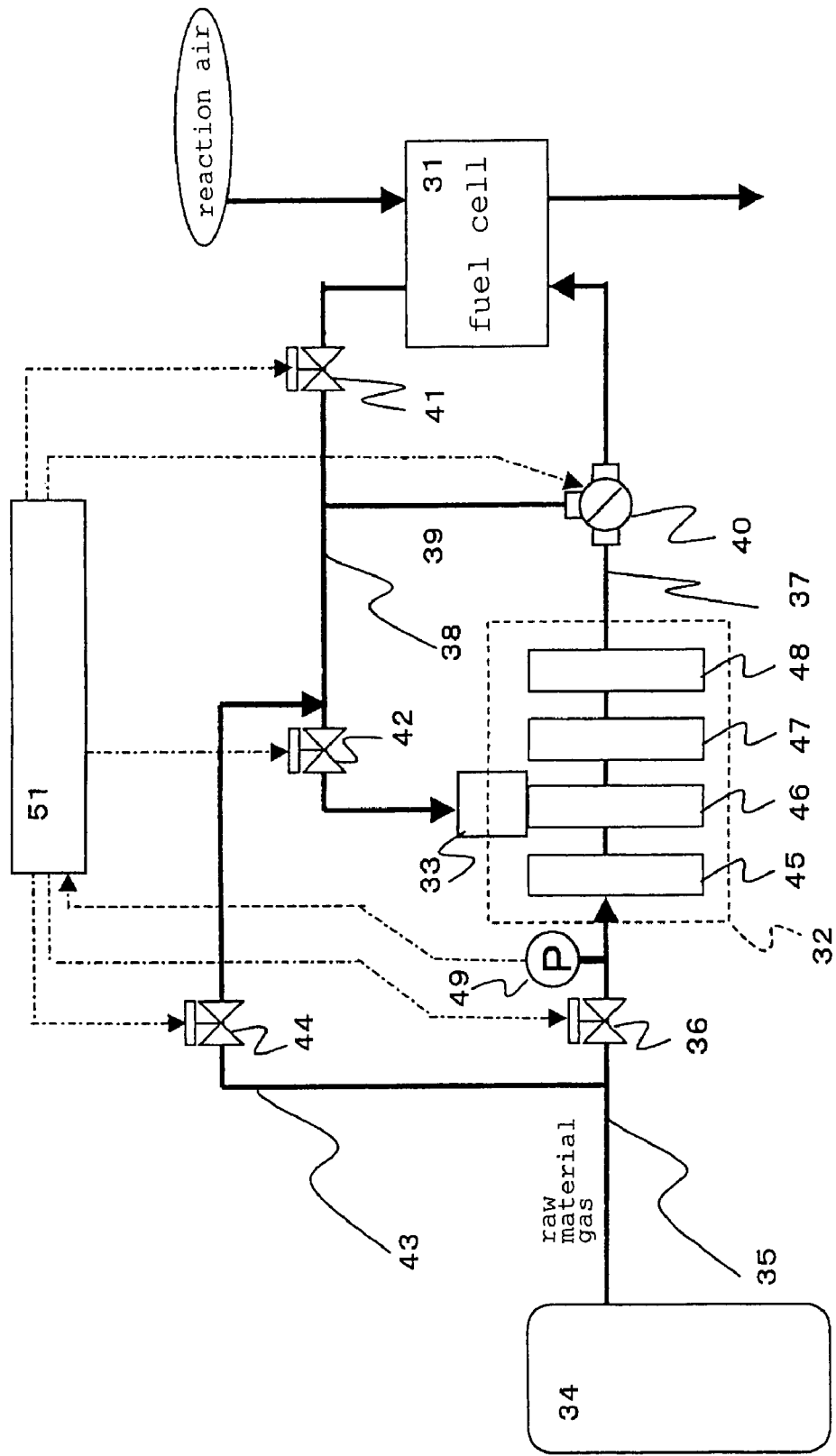
FIG. 13 is a constitutional view showing a fuel cell power generation system of an embodiment 8 according to the present invention.

FIG. 13 is a constitutional view showing the fuel cell power generation system according to an embodiment 8 of the present invention. Units having the identical members and functions with corresponding units shown in FIG. 11 are given the same numerals and their explanation is omitted. The fuel cell power generation system of this embodiment 8 has the same basic constitution as the fuel cell power generation system of the embodiment 7 shown in FIG. 11. However, this embodiment 8 differs from the embodiment 7 with respect to a point that, in place of the control unit 50 of the embodiment 7, a control unit 51 which also has a function to control opening/closing of the fuel gas discharge passage valve 42 in response to a signal from the pressure gauge 49 is provided.

Accordingly, the explanation is made focused on this different point. Here, one example of the control unit of the present invention corresponds to the control unit 51 of the embodiment 8.

Figure 14:
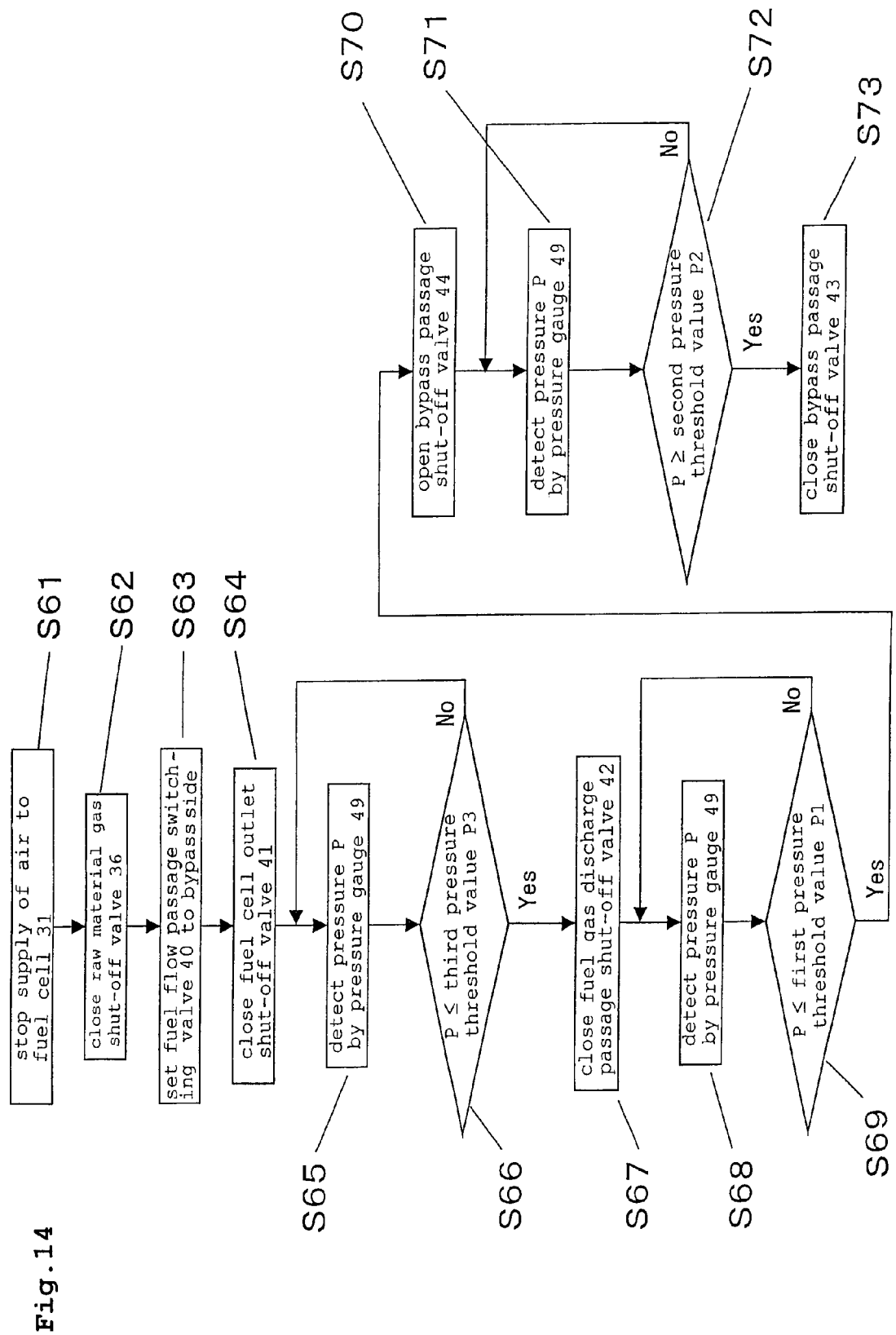
FIG. 14 is a flow chart showing an operation of the fuel cell power generation system of the embodiment 8 according to the present invention.

The manner of operation of the fuel cell power generation system of this embodiment 8 is, in the same manner as the embodiment 7, explained in conjunction with only the manner of operation after the completion of the power generating operation with reference to FIG. 14. Here, FIG. 14 is an exemplary flow chart showing the manner of operation at the time of stopping the fuel cell power generation system of the embodiment 8.

The supply of air which is supplied to the fuel cell 31 is stopped (S61) and, at the same time, the raw material gas shut-off valve 36 is closed (S62) so that the supply of the raw material gas into the fuel treatment device 32 is stopped. Further, the fuel flow passage switching valve 40 is changed over to the fuel cell bypass passage 39 side (S63), the fuel cell outlet valve 41 is closed (S64), the supply of the fuel gas to the fuel cell 31 is stopped thus allowing the fuel cell 31 to assume a hermetically closed state.

A pressure P on an upstream side of the fuel treatment device 32 is detected by the pressure gauge 49 (S65). The detected pressure P is compared with a third pressure threshold value P3 by the control unit 51 (S66).

Here, when the relationship P≦P3 is established, the fuel gas discharge passage valve 42 is closed (S67) and hence, the supply of the fuel gas to the burner 33 is stopped and, at the same time, the space including the fuel treatment device 32 is sealed thus establishing a hermetically closed state.

Subsequently, the pressure gauge 49 detects the pressure P of the hermetically closed space including the fuel treatment device 12 on the upstream side of the fuel treatment device 32 (S68). The detected pressure P is compared with the first pressure threshold value P1 by the control unit 46 (S69).

Here, when the relationship P≦P1 is established, the bypass passage valve 44 is opened (S70) and the raw material gas is supplied to the fuel gas discharge passage 38 which is provided upstream of the fuel gas discharge passage valve 42 through the fuel-treatment-device bypass passage 43. Due to the supply of the raw material gas to the fuel gas discharge passage 38, the pressure of the hermetically closed space including the fuel treatment device 32 can be restored.

Further subsequently, the pressure P is detected (S71) and the detected pressure P is compared with the second pressure threshold value P2 by the control unit 51 (S72), and when the relationship P≧P2 is established, the bypass passage valve 44 is closed (S73) and the fuel treatment device bypass passage 43 is sealed.

By adopting the constitution and the operating method of the fuel cell power generation system of the above-mentioned embodiment 8, it is possible to further obtain following manner of operation and advantageous effects in addition to the manner of operation and advantageous effects explained in the embodiment 7.

By stopping the supply of the raw material gas and water for reforming for stopping the generation of power, it is possible to stop the generation of hydrogen in the fuel treatment device 32. Further, it is possible to stop the supply of the raw material gas instantaneously by closing the raw material gas shut-off valve 36.

On the other hand, even when the supply of water for reforming is stopped, water which is supplied in the inside of the fuel treatment device 32 immediately before the supply of water is stopped is heated and evaporated by an internal residual heat thereafter. Accordingly, when the fuel gas discharge passage valve 42 is closed simultaneously with the stopping of the supply of the raw material gas, pressure in the inside of the space including the fuel treatment device 32 is abnormally increased.

However, in this embodiment 8, the pressure on an upstream side of the fuel treatment device 32 is detected by the pressure gauge 49 and, when the detected pressure assumes a value which is equal to or more than the third pressure threshold value P3, the fuel gas discharge passage valve 42 is opened and hence, a fuel gas flow passage to the burner 33 from the fuel treatment device 32 through the fuel cell bypass passage 39 is ensured. In this manner, by discharging the fuel gas which contains the high-pressure water vapor which is heated and evaporated in the inside of the reformer 46 to the burner 33 which is provided downstream of the fuel treatment device 12, it is possible to lower the internal pressure. Further, when the pressure which is detected by the pressure gauge 49 is lowered to a value equal to or less than the third pressure threshold value P3, the fuel gas discharge passage valve 42 is closed and hence, it is possible to bring the space including the fuel treatment device 32 into a hermetically closed state. Here, one example of the third predetermined threshold value of the present invention corresponds to the third pressure threshold value P3 of the embodiment 8.

Embodiment 9

Figure 15:
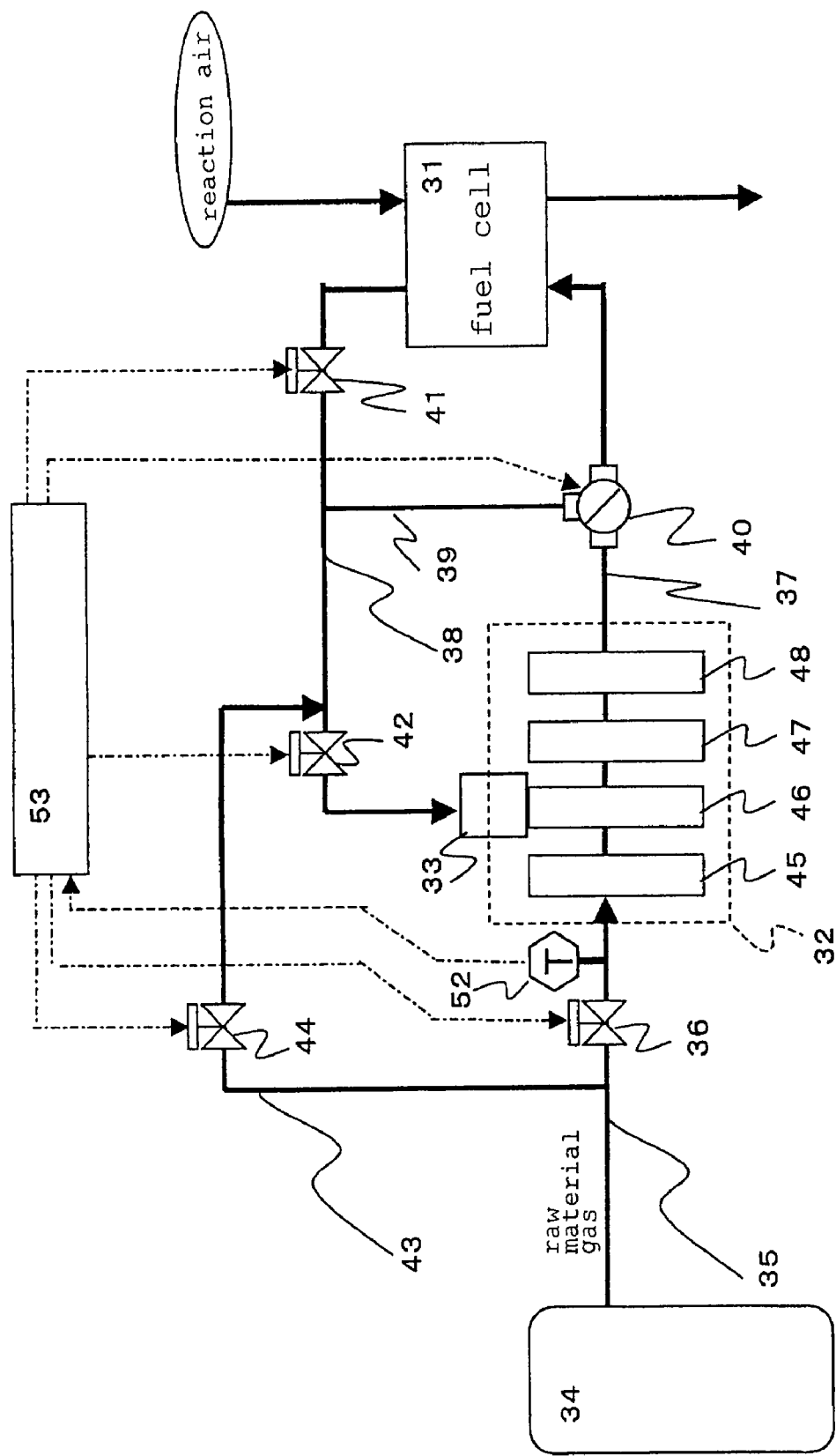
FIG. 15 is a constitutional view showing a fuel cell power generation system of an embodiment 9 according to the present invention.

FIG. 15 is a constitutional view showing a fuel cell power generation system according to an embodiment 9 of the present invention. Units having the identical members and functions with corresponding units shown in FIG. 11 are given the same numerals and their explanation is omitted. The fuel cell power generation system of this embodiment 9 has the same basic constitution as the fuel cell power generation system of the embodiment 7 shown in FIG. 11. However, this embodiment 9 is different from the embodiment 7 with respect to a point that, in place of the pressure gauge 49 of the embodiment 7, a temperature detector 52 which detects a temperature of the raw material gas supply passage 35 provided between the raw material gas shut-off valve 36 and the fuel treatment device 32. This embodiment also includes, in place of the control unit 50 of the embodiment 7, a control unit 53 which controls opening/closing of the bypass passage valve 44 in response to signals from the temperature detector 52. Accordingly, this embodiment 9 is explained by focusing on a point which makes this embodiment different from the embodiment 7. Here, the temperature detector 52 and the control unit 53 of this embodiment 9 indicate one example of a temperature detecting unit and a control unit of the present invention.

Figure 16:
FIG. 16 is a flow chart showing an operation of the fuel cell power generation system of the embodiment 9 according to the present invention.

With respect to the manner of operation of the fuel cell power generation system of this embodiment 9, only the manner of operation at the time of completion of the power generating operation is explained in conjunction with FIG. 16 in the same manner as the embodiment 7. Here, FIG. 16 is an exemplary flow chart showing the manner of operation at the time of stopping the power generating operation of the fuel cell power generation system of the embodiment 9.

The supply of air which is supplied to the fuel cell 31 is stopped (S81) and, at the same time, the raw material gas shut-off valve 36 is closed (S82) so that the supply of the raw material gas into the fuel treatment device 32 is stopped. Further, the fuel flow passage switching valve 40 is changed over to the side of the fuel cell bypass passage 39 (S83), the fuel cell outlet valve 41 is closed (S84) and the supply of the fuel gas into the fuel cell 31 is stopped so that the fuel cell 31 is brought into a hermetically closed state.

Further, the fuel gas discharge passage valve 42 is closed (S85), the supply of the fuel gas into the burner 33 is stopped and, at the same time, a space including the fuel treatment device 32 is brought into a hermetically closed state.

A temperature T of the hermetically closed space including the fuel treatment device 32 on an upstream side of the fuel treatment device 32 is detected by the temperature detector 52 (S86). The detected temperature T is compared with a temperature threshold value T1 by the control unit 53 (S87).

When the relationship $T \leq T1$ is established, the bypass passage valve 44 is opened (S88) and the raw material gas is supplied to the fuel-gas discharge passage 38 which is provided upstream of the fuel gas discharge passage valve 42 through the fuel-treatment-device bypass passage 43. Further, when the supply of the raw material gas to the fuel-gas discharge passage 38 is completed, the bypass passage valve 44 is closed (S89) and the fuel-treatment-device bypass passage 43 is sealed.

By adopting the constitution and the operating method of the fuel cell power generation system of the above-mentioned embodiment 9, it is possible to obtain the following operation and advantageous effects.

When the fuel cell power generation system is stopped, the fuel treatment device 32, the fuel cell bypass passage 39 and the portions of the raw material gas supply passage 35, the fuel gas supply passage 37 and the fuel gas discharge passage 38 are shut off by the raw material gas shut-off valve 36, the fuel flow passage switching valve 40 and the fuel gas discharge passage valve 42 and hence, a hermetically closed state is established. Accordingly, along with a lapse of time, an inner temperature of the fuel treatment device 32 or the like is lowered thus giving rise to the lowering of pressure. Further, a water vapor in the fuel gas sealed in the inside of the fuel treatment device 32 or the like is condensed thus giving rise to further lowering of pressure.

Here, in the same manner as the embodiment 4, the temperature of the hermetically closed space including the fuel treatment device 32 at the time of stopping of the fuel cell power generation system detected by the temperature detector 52 is lowered in accordance with the lowering of the pressure. Accordingly, in this embodiment 9, by using the temperature detector 52 in place of the pressure gauge 49 used in the embodiment 7, it is possible to detect the lowering of the pressure in the inside of the hermetically closed space.

As described above, in this embodiment 9, the temperature of the above-mentioned hermetically closed space is detected by the temperature detector 52 and, when the temperature is lowered to a value less than the temperature threshold value T1, the raw material gas is supplied to the fuel-gas discharge passage 38 which is provided upstream of the fuel gas discharge passage valve 42 through the fuel-treatment-device bypass passage 43 and, after the completion of the supply of the raw material gas, the bypass passage valve 44 is closed thus sealing the flow passage whereby it is possible to restore the pressure of the hermetically closed space including the fuel treatment device 32. Here, one example of the fourth predetermined threshold value of the present invention corresponds to the temperature threshold value T1 of the embodiment 9.

Further, the reforming catalyst of the reformer 46 precipitates carbon thereon when the reforming catalyst is exposed to the hydrocarbon atmosphere such as methane which exhibits the poor water vapor at a temperature of 400° C. or more, and the performance of the catalyst is deteriorated. However, according to this embodiment 9, the raw material gas is supplied corresponding to the lowering of temperature from the vicinity of an upstream of the fuel gas discharge passage valve 42 which is remotely displaced from the fuel treatment device 32 along piping. Here, on the flow passage ranging from the reformer 46 which is provided with the reforming catalyst to the fuel treatment device bypass passage 43 to which the raw material gas is supplied, the shift reaction unit 47, the selective oxidation reaction unit 48, a portion of the fuel gas supply passage 37, the fuel cell bypass passage 39 and a portion of the fuel gas discharge passage 38 are arranged and hence, even when the raw material gas flows in the reformer 46, a flow rate of the raw material gas is extremely small, that is, at a level of the inflow by diffusion, and a small quantity of water vapor remains in the inside of the reformer 46 and hence, the performance of the catalyst is not influenced whereby the catalyst can ensure the performance thereof.

Further, although the case in which "the supply of the raw material gas to the fuel gas discharge passage 38 by opening the bypass passage valve 44" is performed once is explained with respect to this embodiment 9, this operation is performed "for restoring the pressure in the hermetically closed space including the fuel treatment device 32" and hence, in the control unit 53, a plurality of temperature threshold values T1, T2, T3, . . . are set and such an operation may be performed plural times in response to temperature signals from the temperature detector 52.

Here, in this embodiment 9, although "the temperature detector 52 is provided on the raw material gas supply passage 35 which is arranged between the raw material gas shut-off valve 36 and the fuel treatment device 32", it is sufficient that the temperature detector 52 can detect the temperature of at least the pressure of the hermetically closed space including the fuel treatment device 32 which is hermetically closed by the raw material gas shut-off valve 36 and the fuel gas discharge passage valve 42 and hence, the temperature detector 52 may be mounted on the fuel gas supply passage 37 which is provided between the fuel treatment device 32 and the fuel flow passage switching valve 40, may be mounted on the fuel-treatment-device bypass passage 43 which is provided downstream of the bypass passage valve 44, on the fuel cell bypass passage 39, or on the fuel-gas discharge passage 38 which is provided between the fuel cell outlet valve 41 and the fuel gas discharge passage valve 42. Further, the temperature detector 52 may be mounted in the inside of the fuel treatment device 32.

Embodiment 10

Figure 17:
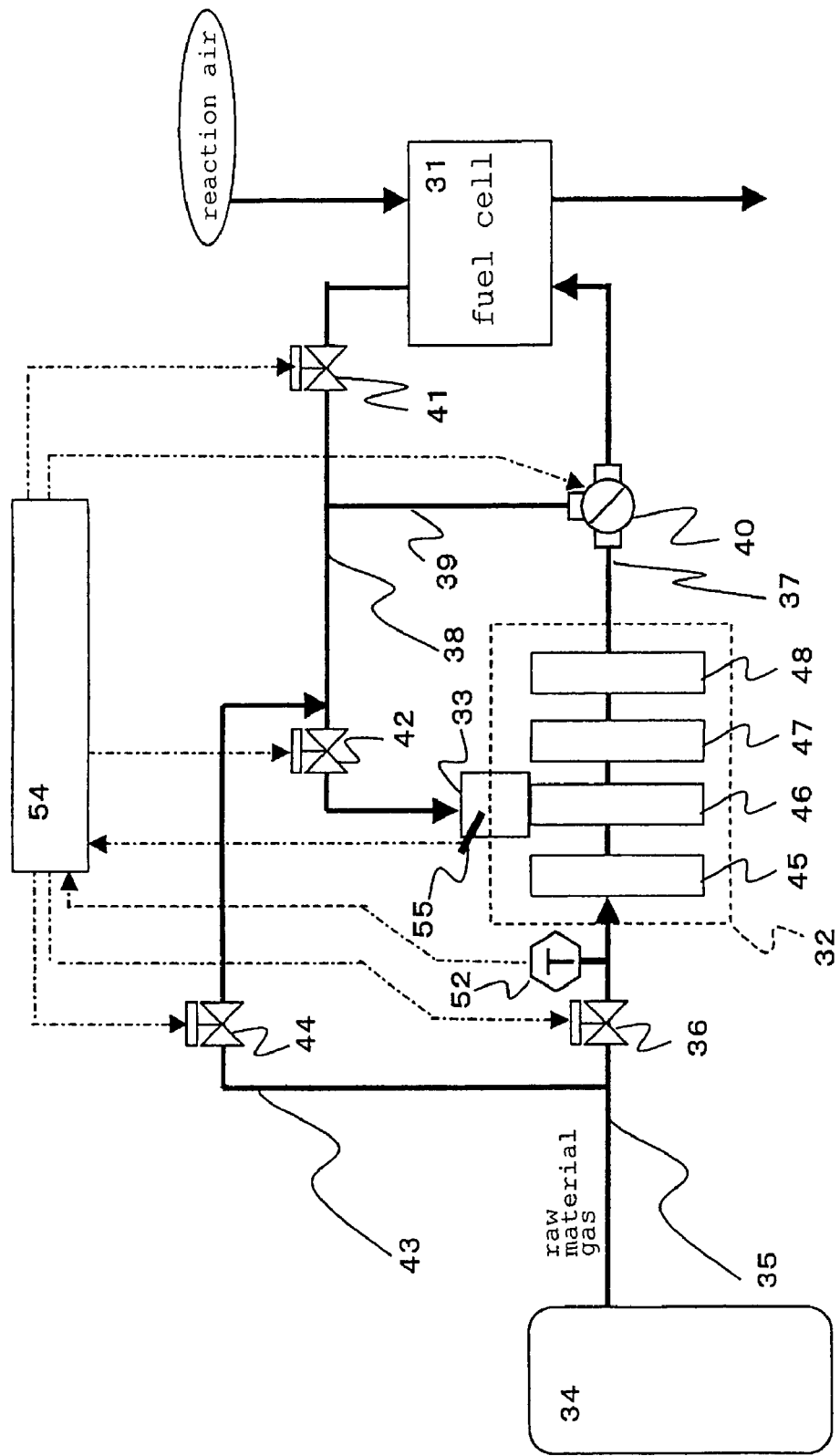
FIG. 17 is a constitutional view showing a fuel cell power generation system of an embodiment 10 according to the present invention.

FIG. 17 is a constitutional view showing a fuel cell power generation system according to an embodiment 10 of the present invention. Units having the identical members and functions with corresponding units shown in FIG. 15 are given the same numerals and their explanation is omitted. The fuel cell power generation system of this embodiment 10 has the same basic constitution as the fuel cell power generation system of the embodiment 9 shown in FIG. 15. However, this embodiment 10 differs from the embodiment 9 with respect to a point that the flame detector 55 for monitoring the combustion condition of the burner 33 and further, the control unit 54 having a function to control the opening/closing of the fuel gas discharge passage valve 42 in response to signals from the flame detector 55 in place of the control unit 53 of the embodiment 9 are arranged. Accordingly, this embodiment 10 is explained by focusing on a point which makes this embodiment different from the embodiment 9. Here, one example of the combustion detecting unit of the present invention corresponds to the flame detector 55 of the embodiment 10 and one example of the control unit of the present invention corresponds to the control unit 54 of the embodiment 10.

Figure 18:
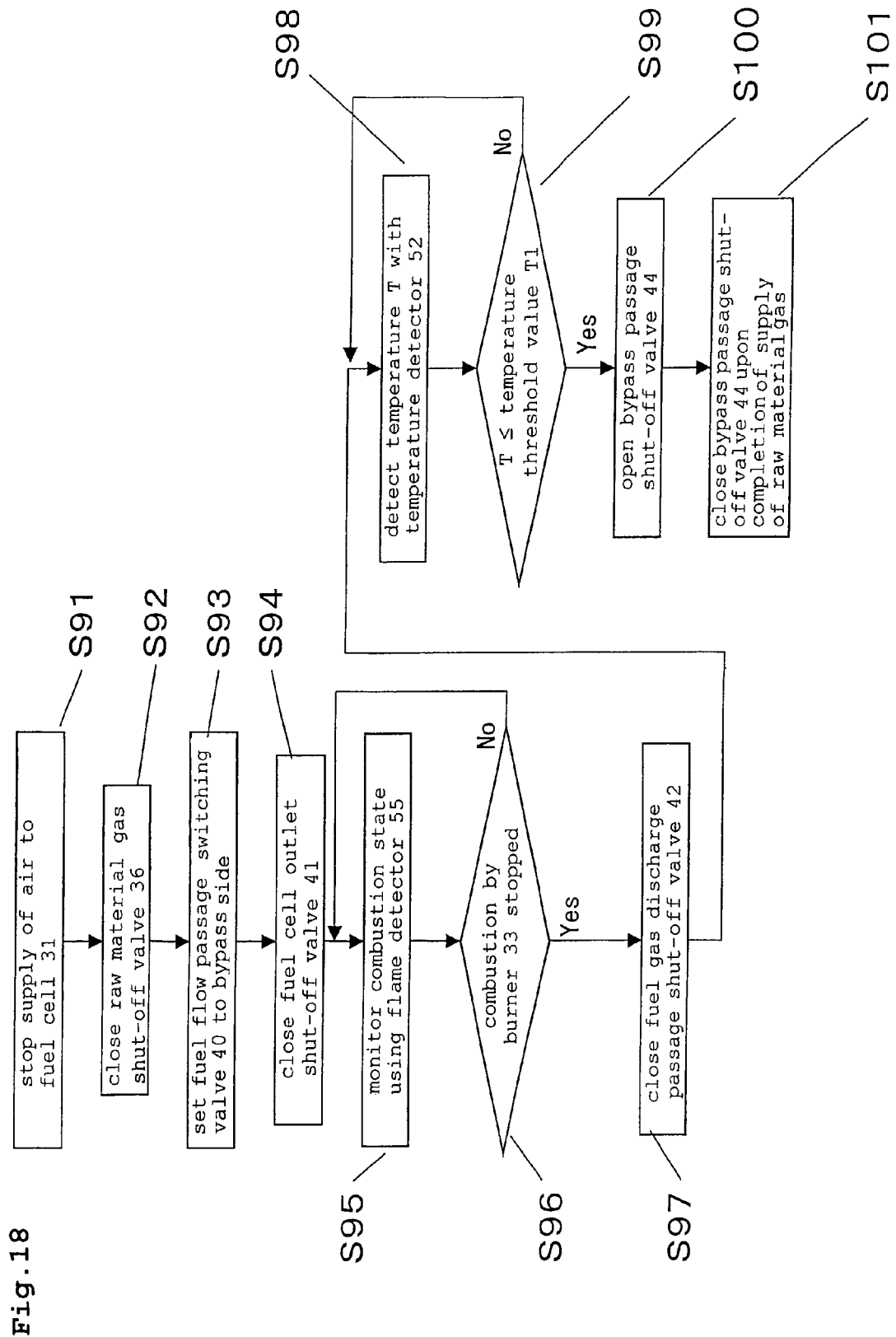
FIG. 18 is a flow chart showing an operation of the fuel cell power generation system of the embodiment 10 according to the present invention.
Figure 19:
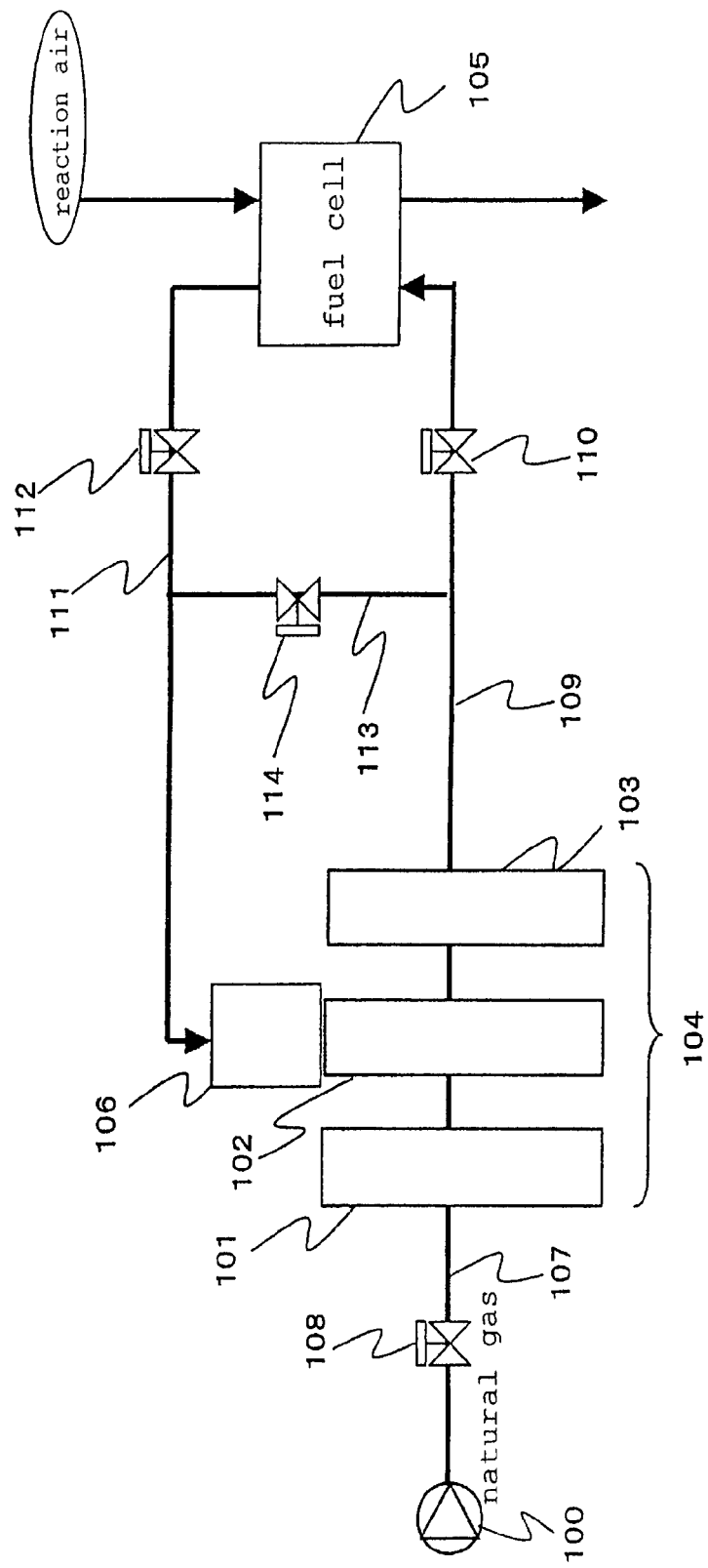
FIG. 19 is a constitutional view showing a conventional fuel cell power generation system.

With respect to the manner of operation of the fuel cell power generation system of this embodiment 10, only the manner of operation at the time of the completion of the power generating operation is explained in conjunction with FIG. 18 in the same manner as the embodiment 9. Here, FIG. 18 is an exemplary flow chart showing the manner of operation at the time of stopping of the power generating operation of the fuel cell power generation system of the embodiment 10.

The supply of air which is supplied to the fuel cell 31 is stopped (S91) and, at the same time, the raw material gas shut-off valve 36 is closed (S92) so that the supply of the raw material gas into the fuel treatment device 32 is stopped. Further, the fuel flow passage switching valve 40 is changed over to the side of the fuel cell bypass passage 39 (S93), the fuel cell outlet valve 41 is closed (S94), the supply of the fuel gas into the fuel cell 31 is stopped so that the fuel cell 31 is brought into a hermetically closed state.

The control unit 54 monitors the combustion condition of the burner 33 in response to signals outputted from the flame detector 55 (S95). When the stopping of the combustion of the burner 33 is detected (S96), fuel gas discharge passage valve 42 is closed (S97) so that the supply of the fuel gas to the burner 33 is stopped and, at the same time, the space including the fuel treatment device 32 is brought into a hermetically closed state.

Next, a temperature T of the hermetically closed space including the fuel treatment device 32 on an upstream side of the fuel treatment device 32 is detected by the temperature detector 52 (S98). The detected temperature T is compared with a temperature threshold value T1 by the control unit 54 (S99).

When the relationship T≦T1 is established, the bypass passage valve 44 is opened (S100) so that the raw material gas is supplied to the fuel-gas discharge passage 38 which is provided upstream of the fuel gas discharge passage valve 42 through the fuel-treatment-device bypass passage 43. When the supply of the raw material gas to the fuel-gas discharge passage 38 is completed, the bypass passage valve 44 is closed (S10) and the fuel-treatment-device bypass passage 43 is sealed. Here, the fourth predetermined threshold value of the present invention corresponds to the temperature threshold value T1 of the embodiment 10.

By adopting the constitution and the operating method of the fuel cell power generation system of the above-mentioned embodiment 10, it is possible to further obtain the following operation and advantageous effects in addition to the operation and advantageous effects explained in the embodiment 8.

By stopping the supply of the raw material gas and water for reforming for stopping the generation of power, it is possible to stop the generation of hydrogen in the fuel treatment device 32. Further, it is possible to stop the supply of the raw material gas instantaneously by closing the raw material gas shut-off valve 36.

On the other hand, even when the supply of water for reforming is stopped, water which is supplied in the inside of the fuel treatment device 32 immediately before the supply of water is stopped is heated and evaporated by an internal residual heat thereafter. Accordingly, when the fuel gas discharge passage valve 42 is closed simultaneously with the stopping of the supply of the raw material gas, pressure in the inside of the space including the fuel treatment device 32 is abnormally increased.

However, in the embodiment 10, since the fuel gas discharge passage valve 42 is opened, it is possible to burn the hydrogen-rich fuel gas which is pushed out from the fuel treatment device 32 by evaporation of water vapor using the burner 33. Upon finishing of the evaporation of water vapor, when the pressure in the inside of the fuel treatment device 32 is lowered so that the fuel gas is no more pushed out from the fuel treatment device 32, the combustion using the burner 33 is also finished. Here, by monitoring a combustion state of the burner 33 using a flame detector 55, it is possible to surely detect such timing and, eventually, it is possible to lower the pressure of the space including the fuel treatment device 32. When the stop of the combustion using the burner 33 is detected, the fuel gas discharge passage valve 42 is closed so that the space including the fuel treatment device 32 is brought into a hermetically closed state.

Here, as the flame detection 55 in this embodiment 10, a flame rod or a thermocouple may be used.

Further, to achieve the above-mentioned object of the present invention, it may be advantageous to provide a program which allows a computer to execute operations of control steps of the operating method of the fuel cell power generation system of the present invention.

Further, to achieve the above-mentioned object of the present invention, it may be advantageous to provide a recording medium which carries a program for allowing a computer to execute the whole or a portion of control steps of the operating method of the fuel cell power generation system of the present invention, wherein the program which is readable or is read by the computer executes the above-mentioned operations in cooperation with the computer.

Further, the above-mentioned "operations of control steps" imply the operations of the whole or the portion of the steps.

Further, one application mode of the above-mentioned program may be a mode in which the program is recorded in the recording medium which is readable by a computer and the program is operated in combination with the computer.

Further, one application mode of the above-mentioned program may be a mode in which the program is transmitted through a transmission medium, is read by a computer, and is operated in cooperation with the computer.

Further, the above-mentioned recording medium includes a ROM or the like, while the transmission medium includes a transmitting medium such as the Internet, light, electric waves, sound waves or the like.

Further, the above-mentioned computer may include not only pure hardware such as a CPU or the like but also firmware, OS, or peripheral equipment.

Here, as has been explained heretofore, the constitution of the present invention may be realized in software as well as in hardware.

INDUSTRIAL APPLICABILITY

The fuel cell power generation system and the operating method of the fuel cell power generation system of the present invention have advantages that it is possible to prevent the hermetically closed space including the fuel treatment device from having the negative pressure after the operation of the system is finished and hence are applicable as effective fuel cell power generation system and operating method of the fuel cell power generation system. Further, the fuel cell power generation system and the operating method of the fuel cell power generation system of the present invention are also applicable to a usage such as a fuel cell automobile which uses hydrogen generated by reforming the fuel made of carbon hydroxide gas such as methane.

The invention claimed is:
1. An operating method of a fuel cell power generation system, comprising the steps of:

closing, when a process for stopping the system is performed, (i) a first valve provided on a first raw material gas supply passage for supplying a raw material gas, which contains an organic compound formed of at least carbon and hydrogen, to a reformer that generates a hydrogen rich fuel gas from the organic compound and water vapor, and (ii) a second valve provided downstream of a carbon monoxide decreasing unit that decreases a carbon monoxide in the hydrogen rich fuel gas generated by the reformer to supply the hydrogen rich fuel gas to a fuel cell; and supplying, with the carbon monoxide decreasing unit communicating with the reformer, the raw material gas to a closed space, which is closed by the first valve and the second valve and includes a fuel treatment device that comprises the reformer and the carbon monoxide decreasing unit, through a second raw material gas supply passage for supplying the raw material gas to a middle portion of the carbon monoxide decreasing unit.

2. An operating method of a fuel cell power generation system according to claim 1, wherein
the second valve is provided on a fuel gas discharge passage, through which a fuel gas discharged from the fuel cell flows.

3. An operating method of a fuel cell power generation system according to claim 1, further comprising the steps of:
detecting a pressure value of the closed space including the fuel treatment device; and
supplying the raw material gas to the closed space when the detected pressure value becomes a value equal to or less than a first threshold value.

4. An operating method of a fuel cell power generation system according to claim 3, further comprising the steps of:
detecting further a pressure value of the closed space after supplying the raw material gas to the closed space; and
stopping supply of the raw material gas to the closed space when the further detected pressure value becomes equal to or more than a second threshold value, which is larger than the first threshold value.

5. An operating method of a fuel cell power generation system according to claim 1, further comprising the steps of:
detecting a pressure value of a flow passage, which is closed by the first valve and the second valve; and
closing the second valve when the detected pressure value becomes a value equal to or less than a third threshold value.

6. An operating method of a fuel cell power generation system according to claim 3, wherein
a pressure detecting unit, which is provided on a flow passage between the first valve and the reformer, is utilized to detect the pressure value of the closed space including the fuel treatment device.

7. An operating method of a fuel cell power generation system according to claim 4, wherein
a pressure detecting unit, which is provided on a flow passage between the first valve and the reformer, is utilized to detect the pressure value of the closed space including the fuel treatment device.

8. An operating method of a fuel cell power generation system according to claim 5, wherein
a pressure detecting unit, which is provided on a flow passage between the first valve and the reformer, is utilized to detect the pressure value of the flow passage closed by the first valve and the second valve.

9. An operating method of a fuel cell power generation system according to claim 1, further comprising the steps of:
detecting a temperature value of the closed space including the fuel treatment device; and
supplying the raw material gas to the closed space when the detected temperature value becomes a value equal to or less than a fourth threshold value.

10. An operating method of a fuel cell power generation system according to claim 1, wherein
the middle portion of the carbon monoxide decreasing unit is a portion between a shift reaction unit and a selective oxidation reaction unit.

* * * * *